(12) United States Patent
Li et al.

(10) Patent No.: US 12,294,090 B2
(45) Date of Patent: *May 6, 2025

(54) ELECTRODE PLATE, ELECTROCHEMICAL APPARATUS, AND APPARATUS THEREOF

(71) Applicant: Contemporary Amperex Technology Co., Limited, Ningde (CN)

(72) Inventors: Wei Li, Ningde (CN); Jing Li, Ningde (CN); Qingrui Xue, Ningde (CN); Zige Zhang, Ningde (CN); Yang Zhang, Ningde (CN); Xianwei Yang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 792 days.

This patent is subject to a terminal disclaimer.

(21) Appl. No.: 17/540,263

(22) Filed: Dec. 2, 2021

(65) Prior Publication Data

US 2022/0093932 A1    Mar. 24, 2022

Related U.S. Application Data

(63) Continuation of application No. PCT/CN2019/125061, filed on Dec. 13, 2019.

(30) Foreign Application Priority Data

Jun. 28, 2019   (CN) .......................... 201910580127.8

(51) Int. Cl.
*H01M 4/66* (2006.01)
*H01M 4/02* (2006.01)
*H01M 4/62* (2006.01)

(52) U.S. Cl.
CPC ........... *H01M 4/667* (2013.01); *H01M 4/625* (2013.01); *H01M 4/661* (2013.01); *H01M 4/663* (2013.01);
(Continued)

(58) Field of Classification Search
CPC ...... H01M 4/667; H01M 4/625; H01M 4/661; H01M 4/663; H01M 4/668;
(Continued)

(56) References Cited

U.S. PATENT DOCUMENTS 4,492,021 A    1/1985  Wright et al.
5,478,676 A   12/1995  Turi et al.
(Continued)

FOREIGN PATENT DOCUMENTS

CN       1579028 A      2/2005
CN       1669163 A      9/2005
(Continued)

OTHER PUBLICATIONS

Liang, CN 208955108 Espacenet machine translation, 2019 (Year: 2019).*

(Continued)

*Primary Examiner* — Adam A Arciero
(74) *Attorney, Agent, or Firm* — East IP P.C.

(57) ABSTRACT

This application relates to an electrode plate, an electrochemical apparatus, and an apparatus thereof. The electrode plate of this application includes a current collector, an electrode active material layer provided on at least one surface of the current collector, and an electrical connection member electrically connected to the current collector. The electrode active material layer is provided on a main body portion of the current collector in a zone referred to as a film zone, the electrical connection member and the current collector are welded and connected at an edge of the current (Continued)

collector, at a welding zone referred to as an transfer welding zone and a transition zone is referred to as an extension zone, where the transition zone is of the current collector between the film zone and the transfer welding zone, and is coated with no electrode active material layer.

18 Claims, 14 Drawing Sheets

(52) U.S. Cl.
CPC ...... *H01M 4/668* (2013.01); *H01M 2004/021* (2013.01)
(58) Field of Classification Search
CPC .. H01M 2004/021; H01M 4/13; H01M 4/666; H01M 50/536; H01M 4/72; H01M 4/626; H01M 10/0525
See application file for complete search history.

(56) References Cited

U.S. PATENT DOCUMENTS

| | | | |
|---|---|---|---|
| 5,645,959 A | 7/1997 | Rowlette | |
| 6,022,642 A | 2/2000 | Tsukamoto et al. | |
| 6,420,066 B1 | 7/2002 | Frustaci et al. | |
| 11,769,883 B2 | 9/2023 | Liang et al. | |
| 2002/0160265 A1 | 10/2002 | Hashimoto et al. | |
| 2004/0126654 A1 | 7/2004 | Sudano et al. | |
| 2004/0126663 A1 | 7/2004 | Sudano et al. | |
| 2005/0221190 A1 | 10/2005 | Sudano et al. | |
| 2006/0019168 A1 | 1/2006 | Li et al. | |
| 2006/0127773 A1 | 6/2006 | Kawakami et al. | |
| 2006/0206186 A1 | 9/2006 | Mori et al. | |
| 2006/0263691 A1 | 11/2006 | Park et al. | |
| 2007/0224502 A1 | 9/2007 | Affinito et al. | |
| 2009/0305135 A1 | 12/2009 | Shi et al. | |
| 2010/0075223 A1 | 3/2010 | Hwang et al. | |
| 2010/0075225 A1 | 3/2010 | Wilkins et al. | |
| 2010/0129699 A1 | 5/2010 | Mikhaylik et al. | |
| 2010/0291442 A1 | 11/2010 | Wang et al. | |
| 2011/0200884 A1 | 8/2011 | Uchida | |
| 2012/0164528 A1 | 6/2012 | Xu et al. | |
| 2012/0208082 A1 | 8/2012 | Honda | |
| 2012/0237824 A1 | 9/2012 | Koh et al. | |
| 2013/0171523 A1 | 7/2013 | Chen et al. | |
| 2014/0072873 A1 | 3/2014 | Wang et al. | |
| 2014/0162138 A1 | 6/2014 | Fujiki et al. | |
| 2014/0370349 A1 | 12/2014 | Kwon et al. | |
| 2015/0303485 A1* | 10/2015 | Kim .................. H01M 4/0404 429/234 |
| 2016/0181620 A1 | 6/2016 | Kim et al. | |
| 2016/0211524 A1 | 7/2016 | Hao et al. | |
| 2016/0294015 A1 | 10/2016 | Tanaka et al. | |
| 2016/0351892 A1 | 12/2016 | Sugimori et al. | |
| 2017/0324077 A1 | 11/2017 | Liu et al. | |
| 2017/0338493 A1 | 11/2017 | Shin et al. | |
| 2017/0353585 A1 | 12/2017 | Krishnan | |
| 2018/0006291 A1 | 1/2018 | Kim et al. | |
| 2018/0006307 A1 | 1/2018 | Song et al. | |
| 2018/0069229 A1 | 3/2018 | Ko et al. | |
| 2018/0145317 A1 | 5/2018 | Momma et al. | |
| 2018/0198132 A1 | 7/2018 | Liang et al. | |
| 2018/0219212 A1 | 8/2018 | Seol et al. | |
| 2018/0287158 A1 | 10/2018 | Ma et al. | |
| 2018/0301709 A1 | 10/2018 | Qiu | |
| 2019/0006658 A1 | 1/2019 | Chae et al. | |
| 2019/0173090 A1 | 6/2019 | Liang et al. | |
| 2019/0173092 A1 | 6/2019 | Liang et al. | |
| 2019/0245210 A1 | 8/2019 | Matsushita | |
| 2020/0083542 A1 | 3/2020 | Yushin et al. | |
| 2020/0295377 A1 | 9/2020 | Liang et al. | |
| 2020/0388875 A1 | 12/2020 | Kano et al. | |
| 2020/0403247 A1 | 12/2020 | Turi et al. | |
| 2021/0066691 A1 | 3/2021 | Asai | |
| 2021/0119218 A1 | 4/2021 | Li et al. | |
| 2021/0119221 A1 | 4/2021 | Li et al. | |
| 2021/0151769 A1 | 5/2021 | Li et al. | |
| 2021/0151772 A1 | 5/2021 | Li et al. | |
| 2021/0167397 A1 | 6/2021 | Kim et al. | |
| 2021/0210763 A1 | 7/2021 | Li et al. | |
| 2021/0288329 A1 | 9/2021 | Liang et al. | |
| 2021/0296654 A1 | 9/2021 | Liang et al. | |
| 2021/0320322 A1 | 10/2021 | Yasuda | |
| 2022/0037663 A1 | 2/2022 | Tamaki et al. | |
| 2022/0037667 A1 | 2/2022 | Li et al. | |
| 2022/0037669 A1 | 2/2022 | Li et al. | |
| 2022/0037670 A1 | 2/2022 | Li et al. | |
| 2022/0037672 A1 | 2/2022 | Xue et al. | |
| 2022/0093932 A1 | 3/2022 | Li et al. | |
| 2022/0093933 A1* | 3/2022 | Li .................... H01M 4/628 |

FOREIGN PATENT DOCUMENTS

| | | |
|---|---|---|
| CN | 1855588 A | 11/2006 |
| CN | 101071860 A | 11/2007 |
| CN | 101174685 A | 5/2008 |
| CN | 101207197 A | 6/2008 |
| CN | 101627494 A | 1/2010 |
| CN | 101884125 A | 11/2010 |
| CN | 102195032 A | 9/2011 |
| CN | 102306800 A | 1/2012 |
| CN | 102332558 A | 1/2012 |
| CN | 102569816 A | 7/2012 |
| CN | 102847859 A | 1/2013 |
| CN | 103131267 A | 6/2013 |
| CN | 103165863 A | 6/2013 |
| CN | 103268942 A | 8/2013 |
| CN | 103326029 A | 9/2013 |
| CN | 203218375 U | 9/2013 |
| CN | 103545530 A | 1/2014 |
| CN | 103779569 A | 5/2014 |
| CN | 103956499 A | 7/2014 |
| CN | 104303344 A | 1/2015 |
| CN | 104321907 A | 1/2015 |
| CN | 204088469 U | 1/2015 |
| CN | 103094619 B | 2/2015 |
| CN | 104659368 A | 5/2015 |
| CN | 104716328 A | 6/2015 |
| CN | 105027347 A | 11/2015 |
| CN | 105406083 A | 3/2016 |
| CN | 105489845 A | 4/2016 |
| CN | 105493323 A | 4/2016 |
| CN | 105514349 A | 4/2016 |
| CN | 105895193 A | 8/2016 |
| CN | 106463698 A | 2/2017 |
| CN | 106654285 A | 5/2017 |
| CN | 106684319 A | 5/2017 |
| CN | 106848324 A | 6/2017 |
| CN | 106898729 A | 6/2017 |
| CN | 106910897 A | 6/2017 |
| CN | 106935901 A | 7/2017 |
| CN | 106941149 A | 7/2017 |
| CN | 106981665 A | 7/2017 |
| CN | 107123812 A | 9/2017 |
| CN | 107154499 A | 9/2017 |
| CN | 107221676 A | 9/2017 |
| CN | 107240721 A | 10/2017 |
| CN | 107302094 A | 10/2017 |
| CN | 107431186 A | 12/2017 |
| CN | 107437622 A | 12/2017 |
| CN | 107565137 A | 1/2018 |
| CN | 107732146 A | 2/2018 |
| CN | 107768677 A | 3/2018 |
| CN | 107851836 A | 3/2018 |
| CN | 207097950 U | 3/2018 |
| CN | 104428928 B | 4/2018 |
| CN | 107925056 A | 4/2018 |
| CN | 108110220 A | 6/2018 |
| CN | 108155363 A | 6/2018 |
| CN | 108199005 A | 6/2018 |
| CN | 108258249 A | 7/2018 |
| CN | 108281662 A | 7/2018 |
| CN | 108306013 A | 7/2018 |

(56) References Cited

FOREIGN PATENT DOCUMENTS

| | | |
|---|---|---|
| CN | 108539252 A | 9/2018 |
| CN | 108598491 A | 9/2018 |
| CN | 108666525 A | 10/2018 |
| CN | 108682788 A | 10/2018 |
| CN | 108832134 A | 11/2018 |
| CN | 109004171 A | 12/2018 |
| CN | 109103490 A | 12/2018 |
| CN | 208298924 U | 12/2018 |
| CN | 109216675 A | 1/2019 |
| CN | 109216703 A | 1/2019 |
| CN | 109273668 A | 1/2019 |
| CN | 208507818 U | 2/2019 |
| CN | 109546154 A | 3/2019 |
| CN | 109546204 A | 3/2019 |
| CN | 109873160 A | 6/2019 |
| CN | 109873161 A | 6/2019 |
| CN | 109873163 A | 6/2019 |
| CN | 109873164 A | 6/2019 |
| CN | 109873166 A | 6/2019 |
| CN | 208955108 U | 6/2019 |
| CN | 110660957 B | 12/2020 |
| CN | 110661001 B | 12/2020 |
| EP | 1551070 A1 | 7/2005 |
| EP | 2903063 A1 | 8/2015 |
| EP | 3182487 A1 | 6/2017 |
| EP | 3367485 A1 | 8/2018 |
| EP | 3389122 A1 | 10/2018 |
| EP | 3796423 A1 | 3/2021 |
| EP | 3796436 A1 | 3/2021 |
| JP | H1167277 A | 3/1999 |
| JP | 2003282064 A | 10/2003 |
| JP | 2003297353 A | 10/2003 |
| JP | 2008258055 A | 10/2008 |
| JP | 2010027530 A | 2/2010 |
| JP | 2011165388 A | 8/2011 |
| JP | 2013254692 A | 12/2013 |
| JP | 2015115233 A | 6/2015 |
| JP | 2017021888 A | 1/2017 |
| JP | 2018049825 A | 3/2018 |
| JP | 2018073723 A | 5/2018 |
| JP | 2018156787 A | 10/2018 |
| JP | 2018174107 A | 11/2018 |
| JP | 2018190656 A | 11/2018 |
| KR | 20140137660 A | 12/2014 |
| KR | 20180000183 A | 1/2018 |
| WO | 2008115168 A2 | 9/2008 |
| WO | 2011029058 A2 | 3/2011 |
| WO | 2012127561 A1 | 9/2012 |
| WO | 2015020338 A1 | 2/2015 |
| WO | 2018180742 A1 | 10/2018 |
| WO | 2018207643 A1 | 11/2018 |
| WO | 2019109928 A1 | 6/2019 |

OTHER PUBLICATIONS

The First Official Action for Chinese Application No. 201910580127.8, dated Mar. 19, 2021, 18 pages.
The Second Official Action for Chinese Application No. 201910580127.8, dated Jun. 16, 2021, 17 pages.
The Rejection Decision for Chinese Application No. 201910580127.8, dated Aug. 6, 2021, 7 pages.
The Extended European Search Report for European Application No. 19934632.1, dated Feb. 21, 2022, 6 pages.
The International Search Report for PCT Application No. PCT/CN2019/125061, dated Mar. 12, 2020, 14 pages.
The Notice of Allowance for U.S. Appl. No. 15/734,469 dated Jun. 9, 2023, 10 pages.
The extended European search report for EP Application No. 19902406.8 dated Aug. 5, 2021, 7 pages.
The Non final Office Action for U.S. Appl. No. 17/112,766, dated Jan. 31, 2024, 31 pages.
The final Office Action for U.S. Appl. No. 17/112,766, dated Jul. 11, 2024, 24 pages.
PCT International Search Report for PCT/CN2019/119739, dated Jan. 14, 2020, 5 pages.
Pszczolkowski Bartosz et al: "A Comparative Analysis of Selected Methods for Determining Young's Modulus in Polylactic Acid Samples Manufactured with the FDM Method", Materials, vol. 15, No. 1, Dec. 25, 2021 (Dec. 25, 2021), 11 pages.
Eunice K Wong et al: "Battery Separator Characterization and Evaluation Procedures for NASA's Advanced Lithium-Ion Batteries", dated May 1, 2010, 68 pages.
"Temperature-Compensated Crystal Oscillator", Elektor Electronics, Elektor Electronics, GB, vol. 25, No. 279, Jul. 1, 1999 (Jul. 1, 1999), 2 pages.
"Material Property Data Sheet for Aluminum", MatWeb, 2021. 1 page.
The First Office Action for Chinese Application No. 201811638645.2 dated Jun. 16, 2020, 15 pages.
The Third Office Action for Chinese Application No. 201811638645.2 dated Sep. 18, 2021, 12 pages.
The First Office Action for EP Application No. 19906208.4 dated Mar. 6, 2023, 9 pages.
The ISR for PCT application No. PCT/CN2019/117143, dated Mar. 11, 2020, 6 pages.
The First Office Action for Chinese Application No. 201811644245.2 dated Jun. 9, 2020, 21 pages.
The Non Final Rejection for the U.S. Appl. No. 17/132,548, dated Apr. 20, 2023, 7 pages.
The Final Rejection for the U.S. Appl. No. 17/132,548, dated Jun. 6, 2023, 9 pages.
The ISR for PCT application No. PCT/CN2019/117142, dated Feb. 3, 2020, 5 pages.
The First Office Action for Chinese Application No. 201811638781.1 dated Jun. 4, 2020, 15 pages.
The extended European search report for EP Application No. 19905422.2, dated Sep. 9, 2021, 9 pages.
The Final Office Action for U.S. Appl. No. 17/112,749, dated Mar. 14, 2024, 11 pages.
PCT International Search Report for PCT/CN2019/117141, dated Feb. 5, 2020, 5 pages.
The Third Office Action for Chinese Application No. 201811644244.8 dated Jan. 12, 2021, 7 pages.
The extended European search report for EP Application No. 19903066.9, dated Jul. 19, 2021, 9 pages.
The Non Final Rejection for U.S. Appl. No. 17/059,503, dated Aug. 30, 2023, 23 pages.
The Non Final Rejection for U.S. Appl. No. 17/059,503, dated Jun. 21, 2024, 26 pages.
The ISR for PCT application No. PCT/CN2019/119702, dated Feb. 19, 2020, 6 pages.
The First Office Action for Chinese Application No. 201811638405.2 dated Jun. 9, 2020, 14 pages.
The extended European search report for EP Application No. 19902246.8, dated Nov. 29, 2021, 9 pages.
The First Office Action for EP Application No. 19902246.8 dated Jul. 1, 2022, 6 pages.
The Non final Office Action for U.S. Appl. No. 17/335,034, dated Mar. 31, 2023, 12 pages.
PCT International Search Report for PCT/CN2019/119717, dated Jan. 23, 2020, 7 pages.
The First Office Action for Chinese Application No. 201910299179.8 dated Sep. 2, 2020, 18 pages.
The Second Office Action for Chinese Application No. 201910299179.8 dated Dec. 9, 2020, 10 pages.
PCT International Search Report for PCT/CN2019/129352, dated Mar. 27, 2020, 8 pages.
The Final Office Action for US Application No. 17/139,124, dated Nov. 4, 2022, 12 pages.
Matweb Datasheet for Aluminum, 2022, 2 pages.
The First Office Action for Chinese Application No. 201910299937.6 dated Sep. 1, 2020, 26 pages.
The extended European search report for EP Application No. 19924802.2, dated Apr. 26, 2022, 9 pages.
PCT International Search Report for PCT/CN2019/129354, dated Mar. 26, 2020, 7 pages.

(56) References Cited

OTHER PUBLICATIONS

The First Office Action for Chinese Application No. 201910299297.9 dated Aug. 20, 2020, 14 pages.
The Notice of Allowance for Chinese Application No. 201910299297.9 dated Nov. 27, 2020, 6 pages.
The extended European search report for EP Application No. 19924692.7, dated Mar. 21, 2022, 10 pages.
PCT International Search Report for PCT/CN2019/129356, dated Mar. 26, 2020, 6 pages.
The Non final Office Action for U.S. Appl. No. 17/501,902, dated May 7, 2024, 15 pages.
The Final Office Action for U.S. Appl. No. 17/501,902, dated Aug. 26, 2024, 18 pages.
The First Office Action for Chinese Application No. 201910299473.9 dated Aug. 18, 2020, 20 pages.
The Notice of Allowance for Chinese Application No. 201910299473.9 dated Oct. 18, 2021, 6 pages.
The extended European search report for EP Application No. 19925225.5, dated Mar. 22, 2022, 8 pages.
The Non Final Office Action for U.S. Appl. No. 17/501,905, dated Sep. 14, 2023, 11 pages.
PCT International Search Report for PCT/CN2019/129357, dated Jan. 23, 2020, 6 pages.
The First Office Action for Chinese Application No. 201910586647.X dated Jun. 16, 2023, 15 pages.
The Notice of Allowance for Chinese Application No. 201910586647.X dated Aug. 15, 2023, 6 pages.
The extended European search report for EP Application No. 19933228.9, dated Sep. 30, 2021, 9 pages.
The Non final Office Action for U.S. Appl. No. 17/139,124, dated Mar. 19, 2021, 12 pages.
The Non final Office Action for U.S. Appl. No. 17/139,124, dated Aug. 10, 2022, 13 pages.
The Notice of Allowance for U.S. Appl. No. 17/139,124, dated Aug. 23, 2023, 9 pages.
PCT International Search Report for PCT/CN2019/129360, dated Apr. 1, 2020, 8 pages.
The First Office Action for Chinese Application No. 201811637655.4 dated Jun. 16, 2020, 15 pages.
The extended European search report for EP Application No. 19902910.9, dated Jul. 8, 2021, 10 pages.
The Final Office Action for U.S. Appl. No. 17/112,766, dated Mar. 10, 2025, 27 pages.

* cited by examiner

ELECTRODE PLATE, ELECTROCHEMICAL APPARATUS, AND APPARATUS THEREOF

CROSS-REFERENCE TO RELATED APPLICATIONS

This application is a continuation of International Application No. PCT/CN2019/125061, filed on Dec. 13, 2019, which claims priority to Chinese Patent Application No. 201910580127.8 filed on Jun. 28, 2019 and entitled "ELECTRODE PLATE AND ELECTROCHEMICAL APPARATUS", both of which are incorporated herein by reference in their entireties.

TECHNICAL FIELD

This application relates to the battery field, and specifically, to an electrode plate, an electrochemical apparatus, and an apparatus thereof.

BACKGROUND

Lithium-ion batteries are widely applied to electric vehicles and consumer electronic products due to their advantages such as high energy density, high output power, long cycle life, and low environmental pollution. With continuous expansion of an application scope of the lithium-ion batteries, requirements for weight energy density and volumetric energy density of the lithium-ion batteries are increasingly high.

In order to obtain a lithium-ion battery with higher quality energy density and volumetric energy density, the following improvements are usually made to the lithium-ion battery: (1) selecting a positive electrode material or a negative electrode material with high specific discharge capacity; (2) optimizing a mechanical design of the lithium-ion battery to minimize its volume; (3) selecting a positive electrode plate or a negative electrode plate with high compacted density; and (4) reducing a weight of each component of the lithium-ion battery.

A current collector is usually improved by selecting a lighter or thinner current collector. For example, a perforated current collector or a plastic current collector coated with a metal layer may be used.

For an electrode plate and a battery using the plastic current collector (composite current collector) coated with the metal layer, although the energy density is increased, some problems or performance degradation may occur in terms of processing performance, electrochemical performance, and the like. To obtain an electrode plate and a current collector with good electrochemical performance, improvements in many aspects are still required.

This application is hereby filed to overcome disadvantages in the prior art.

SUMMARY

In view of this, some embodiments of this application provide an electrode plate, an electrochemical apparatus, and an apparatus thereof.

According to a first aspect, this application provides an electrode plate, including a current collector, an electrode active material layer provided on at least one surface of the current collector, and an electrical connection member electrically connected to the current collector, where the electrode active material layer is provided on a main body portion of the current collector at a zone referred to as a film zone, the electrical connection member and the current collector are welded and connected at an edge of the current collector at a welding zone referred to as an transfer welding zone, and a transition zone is referred to as an extension zone, where the transition zone is of the current collector between the film zone and the transfer welding zone, and is coated with no electrode active material layer; the current collector includes a support layer and a conductive layer provided on at least one surface of the support layer, a single-sided thickness D2 of the conductive layer satisfies: 30 nm≤D2≤3 µm, and the support layer is a polymer material layer or a polymer composite material layer; and a conductive primer coating layer containing a binder and a conductive material is separately provided between the current collector and the electrode active material layer in the film zone of the current collector and on the surface of the extension zone of the current collector.

According to a second aspect, this application provides an electrochemical apparatus, including a positive electrode plate, a negative electrode plate, a separator, and an electrolyte solution, where the positive electrode plate and/or the negative electrode plate are/is the electrode plate according to the first aspect of this application.

According to a third aspect, this application further provides an apparatus, including the electrochemical apparatus according to the second aspect of this application, where the electrochemical apparatus may serve as a power supply of the apparatus or serve as an energy storage unit of the apparatus.

Compared with the prior art, the technical solutions of this application have at least the following beneficial effects:

First, the electrode plate in this application uses a composite current collector. Because the composite current collector has a relatively thin conductive layer and the support layer includes the polymer material or the polymer composite material, energy density of the electrochemical apparatus can be significantly improved, such as weight energy density.

Second, the composite current collector generates a relatively small metal burr in abnormal nail penetration and other cases due to its relatively thin conductive layer, and has greater short-circuit resistance than that of a conventional metal current collector in the abnormal nail penetration and other cases due to its support layer having a polymer material or a polymer composite material. Therefore, nail penetration safety performance of the electrochemical apparatus is greatly improved.

Third, because the composite current collector has a relatively thin conductive layer (compared with a conventional metal foil current collector such as an aluminum foil or a copper foil), the conductive layer is prone to damage, the electrode plate is highly polarized and has a poor current flow capacity, much heat is generated during battery operation, and the like. To solve these problems, in this application, a conductive primer coating layer containing a binder and a conductive material is separately provided on surfaces of the film zone and the extension zone of the composite current collector. The conductive primer coating layer can enhance adhesion between the current collector and an active substance, and ensure that the electrode active material layer is more firmly provided on the surface of the composite current collector, and improve the current flow capacity and electrochemical performance of the electrode plate. By improving the interface of the conductive layer, the conductive primer coating layer can make migration of electrons on the entire electrode plate smoother, reduce polarization, and improve the current flow capacity of the electrode plate, and can also resolve inhomogeneous current distribution and large local polarization on the electrode plate. As a result, the electrode plate using the composite current collector has electrical properties equivalent to or even better than that of an electrode plate using the conventional metal foil current collector.

Therefore, the electrode plate and the electrochemical apparatus (for example, a lithium-ion battery) including the electrode plate in this application have good energy density, electrochemical performance (especially good current flow capacity), and safety performance.

The apparatus in this application includes the electrochemical apparatus provided in this application, and therefore has at least the same advantages as the electrochemical apparatus.

BRIEF DESCRIPTION OF DRAWINGS

The following describes an electrode plate and an electrochemical apparatus in this application in detail with reference to the accompanying drawings and embodiments.

Figure 1:
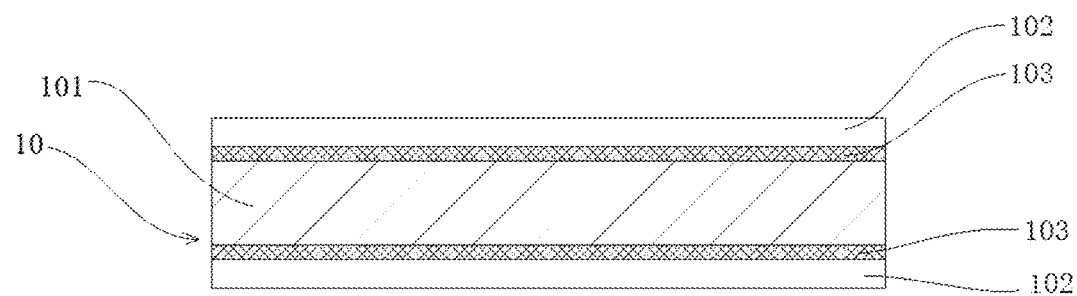
FIG. 1 is a schematic structural cross-sectional view of a positive electrode current collector according to an embodiment of this application.

Reference signs are described as follows:
1. battery pack
2. upper box body
3. lower box body
4. battery module
5. secondary battery
51. outer packaging
52. electrode assembly
53. top cover assembly

DESCRIPTION OF EMBODIMENTS

The following further describes this application with reference to embodiments. It should be understood that these specific embodiments are merely intended to illustrate this application but not to limit the scope of this application.

The first aspect of this application relates to an electrode plate, including a current collector, an electrode active material layer provided on at least one surface of the current collector, and an electrical connection member electrically connected to the current collector, where the electrode active material layer is provided on a main body portion of the current collector at a zone referred to as a film zone, the electrical connection member and the current collector are welded and connected at an edge of the current collector, at a welding zone referred to as an transfer welding zone and a transition zone is referred to as an extension zone, where the transition zone is of the current collector between the film zone and the transfer welding zone, and is coated with no electrode active material layer the current collector includes a support layer and a conductive layer provided on at least one surface of the support layer, a single-sided thickness D2 of the conductive layer satisfies: 30 nm≤D2≤3 μm, and the support layer is a polymer material layer or a polymer composite material layer; and a conductive primer coating layer containing a binder and a conductive material is separately provided between the current collector and the electrode active material layer in the film zone of the current collector and on the surface of the extension zone of the current collector.

Obviously, the electrode plate may be a positive electrode plate or a negative electrode plate. When the electrode plate is a positive electrode plate, correspondingly, the current collector and the electrode active material layer therein are a positive electrode current collector and a positive electrode active material layer, respectively. When the electrode plate is a negative electrode plate, correspondingly, the current collector and the electrode active material layer therein are a negative electrode current collector and a negative electrode active material layer, respectively.

The current collector used for the electrode plate in the first aspect of this application is a composite current collector, and the composite current collector is formed by at least two materials. In terms of a structure, the current collector includes a support layer and a conductive layer provided on at least one surface of the support layer, and a single-sided thickness D2 of the conductive layer satisfies: 30 nm≤D2≤3 μm. Therefore, it is the conductive layer in the current collector that plays a role of conducting electricity. The thickness D2 of the conductive layer is much less than a thickness of a metal current collector such as Al foil or Cu foil commonly used in the prior art (the thickness of commonly used Al foil and Cu foil metal current collector is usually 12 μm and 8 μm). Therefore, mass energy density and volumetric energy density of the electrochemical apparatus (such as a lithium battery) using the electrode plate can be increased. In addition, the composite current collector may further greatly improve nail penetration safety performance of the electrode plate. This is because the composite current collector is provided with a relatively thin conductive layer. Therefore, in an abnormal case such as nail penetration, metal burrs generated are relatively small. In addition, the composite current collector also has a support layer using a polymer material or a polymer composite material. Therefore, short-circuit resistance is greater than that of a conventional metal current collector in the abnormal case such as nail penetration. These factors jointly greatly improve the nail penetration safety performance of the electrochemical apparatus.

However, due to a relatively thin conductive layer of this composite current collector, compared with the conventional metal current collector (Al foil or Cu foil), the composite current collector has poorer conductivity, and the conductive layer is prone to damage in the electrode plate processing process, further affecting the electrochemical performance of the electrochemical apparatus. Therefore, in the electrode plate of this application, the conductive primer coating layer containing the conductive material and the binder is provided between the current collector and the electrode active material layer in the film zone of the current collector to resolve the above technical problems. By effectively mending the surface of the current collector and constructing a conductive network among the current collector, the conductive primer coating layer, and an active substance, the conductive primer coating layer improves electron transfer efficiency, and reduces resistance of the electrode plate containing the composite current collector, thereby effectively reducing internal direct current resistance (DCR) of a battery cell, improving power performance of the battery cell, and ensuring that the battery cell is not prone to phenomena such as relatively great polarization and lithium plating during long-term cycling, that is, effectively improving the long-term reliability of the battery cell. In addition, the conductive primer coating layer can also improve an interface situation between the composite current collector and the electrode active material layer, enhance adhesion between the current collector and the active substance, and ensure that the electrode active material layer is more firmly provided on the surface of the composite current collector.

In addition, after a tab (that is, the electrical connection member) is electrically connected to a surface of the conductive layer of the composite current collector, because the conductive layer is relatively thin and prone to damage, the electrode plate has relatively poor current flow capacity (especially at the tab), much heat is generated during battery operation, and polarization is great. Therefore, in the electrode plate of this application, in addition to providing the conductive primer coating layer between the current collector and the electrode active material layer in the film zone of the composite current collector, the conductive primer coating layer containing the conductive material and the binder is also provided on the surface of the extension zone of the current collector to solve the above technical problems. The conductive primer coating layer can improve the current flow capacity and electrochemical performance of the electrode plate. By improving the interface of the conductive layer, the conductive primer coating layer can make migration of electrons on the entire electrode plate smoother, reduce polarization, and improve the current flow capacity of the electrode plate, and can also resolve inhomogeneous current distribution and large local polarization on the electrode plate.

Therefore, the electrode plate and the electrochemical apparatus (for example, a lithium-ion battery) including the electrode plate in this application have good energy density, electrochemical performance (especially good current flow capacity), and safety performance.

In addition, because the conductive layer of the current collector in the extension zone is thinner than that of the conventional metal current collector, to prevent damage, such as breakage and fracture of the conductive layer, in a preferred embodiment, a thickness of the conductive primer coating layer in the extension zone can be increased, or a conductive material contained in the conductive primer coating layer can be increased, or an additional support protection layer is provided on the surface of the conductive primer, to prevent the current collector from being mechanically damaged and affecting conductive performance of the electrode plate, thereby further improving the current flow capacity of the electrode plate. Therefore, in the electrode plate according to some preferred embodiments of this application, a thickness of the conductive primer coating layer in the extension zone of the current collector is greater than a thickness of the conductive primer coating layer in the film zone, or the conductive material contained in the conductive primer coating layer in the extension zone of the current collector is higher than the conductive material contained in the conductive primer coating layer in the film zone, or a support protection layer is further provided on the surface of the conductive primer coating layer in the extension zone of the current collector, and the support protection layer is an organic insulation layer or an inorganic insulation layer.

In addition, the support layer (polymer material or polymer composite material) of the composite current collector has a greater rebound degree than that of the conventional metal current collector. Therefore, if coating is performed on the surface of the composite current collector and then compacting is performed in a roll-in process according to a conventional process, a series of other problems may arise. Due to the rebound of the support layer, edges on both sides of the electrode plate are wrapped upward, and as a result, the entire electrode plate has a curvature, thereby causing deformation of the electrode plate. Deformation of the electrode plate may cause separation between the electrode active material layer and the composite current collector, breakage of the conductive layer, peeling of the conductive layer from the support layer, and the like, thereby deteriorating electrochemical performance of the electrode plate. Furthermore, the deformation of the electrode plate will also make the positive electrode plate and the negative electrode plate unable to accurately align. Therefore, the electrode plate prepared by using the composite current collector is prone to technical problems such as relatively great internal resistance and relatively great polarization. In the prior art, to resolve the deformation problem of the electrode plate that is caused by the composite current collector, some special technical measures usually need to be taken to release stress during a slurry drying process of the active material or the roll-in process, or a yield rate is inevitably compromised when a conventional process is used. In view of this, in a preferred embodiment of this application, in addition to designing of material distribution in a thickness direction of the electrode plate, material distribution in a traverse direction of the active material layer of the electrode plate (that is, a direction parallel to a surface of the electrode plate) is also specially designed. According to the preferred embodiment of this application, based on compacted density, the electrode active material layer of the electrode plate includes 2n+1 (n=1, 2, or 3) zones distributed in a width direction of the electrode plate (that is, a direction perpendicular to a coating direction), and compacted density of a middle zone is greater than compacted density of zones on two sides. Such special partition design can effectively suppress curvature and edge warping of the composite current collector and the electrode plate caused by roll-in and the like. This ensures that the electrode plate maintains better flatness after roll-in, eliminates or reduces technical problems such as relatively great internal resistance and relatively great polarization of the electrode plate, and helps protect the conductive layer from damage, thereby ensuring a good current flow capacity of the electrode plate and good electrochemical performance of the electrochemical apparatus.

The following describes in detail a structure, a material, performance, and the like of the electrode plate (and the current collector in the electrode plate) provided in the first aspect of this application.

Conductive Layer of a Current Collector

Compared with a conventional metal current collector, in the current collector in an embodiment of this application, the conductive layer has a conductive function and a current collection function, and is configured to provide electrons for the electrode active material layer.

The material of the conductive layer is selected from at least one of a metal conductive material and a carbon-based conductive material.

The metal conductive material is preferably selected from at least one of aluminum, copper, nickel, titanium, silver, nickel-copper alloy, and aluminum-zirconium alloy.

The carbon-based conductive material is preferably selected from at least one of graphite, acetylene black, graphene, and carbon nanotube.

The material of the conductive layer is preferably a metal conductive material, that is, the conductive layer is preferably a metal conductive layer. When the current collector is a positive electrode current collector, aluminum is usually used as the material of the conductive layer; and when the current collector is a negative electrode current collector, copper is usually used as the material of the conductive layer.

When the conductive layer has poor conductivity or a too small thickness, the internal resistance and polarization of the battery may be large; and when the conductive layer is too thick, an effect of improving weight energy density and volumetric energy density of the battery cannot be achieved.

The single-sided thickness of the conductive layer is D2. D2 preferably satisfies: 30 nm≤D2≤3 µm, more preferably 300 nm≤D2≤2 µm, and most preferably 500 nm≤D2≤1.5 µm, to better ensure a light weight and good conductivity of the current collector.

In a preferred embodiment of this application, an upper limit of the single-sided thickness D2 of the conductive layer may be 3 µm, 2.5 µm, 2 µm, 1.8 µm, 1.5 µm, 1.2 µm, 1 µm, and 900 nm, and a lower limit of the single-sided thickness D2 of the conductive layer may be 800 nm, 700 nm, 600 nm, 500 nm, 450 nm, 400 nm, 350 nm, 300 nm, 100 nm, 50 nm, and 30 nm. A range of the single-sided thickness D2 of the conductive layer may be composed of any values of the upper limit or the lower limit. Preferably, 300 nm≤D2≤2 µm; or more preferably, 500 nm≤D2≤1.5 µm.

Because the thickness of the conductive layer in this application is relatively small, damage such as cracks are prone to occur in a process such as production of the electrode plate. Generally, cracks exist in the conductive layer of the electrode plate in this application. The cracks in the conductive layer usually exist irregularly in the conductive layer. The cracks may be elongated cracks, cross-shaped cracks, divergent cracks, and the like, or the cracks may be cracks that penetrate the entire conductive layer, or may be formed on the surface of the conductive layer. Cracks in the conductive layer are usually caused by the roll-in during the electrode plate processing, excessive amplitude of a welded tab, and excessive reeling tension of a substrate.

The conductive layer may be formed on the support layer through at least one of mechanical roll-in, bonding, vapor deposition (vapor deposition), electroplating, and electroless plating (Electroless plating). The vapor deposition method is preferably physical vapor deposition (Physical Vapor Deposition, PVD). The physical vapor deposition method is preferably at least one of an evaporating method and a sputtering method. The evaporating method is preferably at least one of vacuum evaporating (vacuum evaporating), thermal evaporation deposition (Thermal Evaporation Deposition), and electron beam evaporation method (electron beam evaporation method, EBEM). The sputtering method is preferably magnetron sputtering (Magnetron sputtering).

Preferably, at least one of vapor deposition, electroplating, or electroless plating is used, so that the support layer and the conductive layer are more tightly bonded.

Support Layer of a Current Collector

In the current collector in an embodiment of this application, the support layer has functions of supporting and protecting the conductive layer. Because the support layer generally uses an organic polymer material or a polymer composite material, density of the support layer is usually lower than density of the conductive layer, which can significantly increase the weight energy density of the battery compared with a conventional metal current collector.

In addition, the metal layer having a smaller thickness is used, which can further increase the weight energy density of the battery. In addition, because the support layer can well support and protect the conductive layer on a surface of the support layer, a common fracture phenomenon of an electrode plate in the conventional current collector is not prone to occur.

The material of the support layer is selected from at least one of an insulation polymer material, an insulation polymer composite material, a conductive polymer material, and a conductive polymer composite material.

The insulation polymer material is, for example, selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), poly(p-phenylene ether), polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products.

The insulation polymer composite material is, for example, selected from a composite material formed of an insulation polymer material and an inorganic material, where the inorganic material is preferably at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulation polymer material and a conductive material, where the conductive material is selected from at least one of a conductive carbon material, a metal material, and a composite conductive material, the conductive carbon material is selected from at least one of carbon black, carbon nanotube, graphite, acetylene black, and graphene, the metal material is selected from at least one of nickel, iron, copper, aluminum or alloy of the foregoing metal, and the composite conductive material is selected from at least one of nickel-coated graphite powder and nickel-coated carbon fiber.

A person skilled in the art can appropriately select and determine the material of the support layer based on an actual need of the application environment, costs and other factors. In this application, the material of the support layer is preferably an insulation polymeric material or an insulation polymeric composite material, especially when the current collector is a positive electrode current collector.

When the current collector is a positive electrode current collector, the safety performance of the battery can be significantly improved by using a composite current collector supported by an insulation layer and having a conductive layer with a specified thickness. Because the insulation layer is non-conductive, its resistance is relatively large, which can increase the short-circuit resistance when the battery is short-circuited in an abnormal case, and greatly reduce the short-circuit current. Therefore, heat generated by the short circuit can be greatly reduced, thereby improving the safety performance of the battery. In addition, the conductive layer is relatively thin, so that in an abnormal case such as nail penetration, a local conductive network is cut off, preventing a large zone of the electrochemical apparatus or even the entire electrochemical apparatus from being short-circuited. This can limit the damage of the electrochemical apparatus caused by nail penetration to a penetrated site, only forming a "point disconnection" without affecting the normal operation of the electrochemical apparatus within a period of time.

A thickness of the support layer is D1, and D1 preferably satisfies: 1 µm≤D1≤20 µm, or more preferably 1 µm≤D1≤15 µm.

Due to moderate content of the support layer, mechanical strength of the support layer can be adapted to the electrode plate processing technology, and volume energy density of the battery corresponding to the current collector is improved.

An upper limit of the thickness D1 of the support layer may be 20 µm, 15 µm, 12 µm, 10 µm, and 8 µm, and a lower limit may be 1 µm, 1.5 µm, 2 µm, 3 µm, 4 µm, 5 µm, 6 µm, and 7 µm; and a range of the thickness D1 of the support layer may be composed of any values of the upper limit or lower limit. Preferably, 1 µm≤D1≤15 µm, more preferably 2 µm≤D1≤10 µm, and most preferably 3 µm≤D1≤8 µm.

In addition, the specified thickness in this application can further ensure that the current collector has great resistance, and significantly reduce a battery temperature increase when a short circuit occurs in the battery. When the conductive layer is made of aluminum, this can further significantly reduce or prevent a thermit reaction of the positive electrode current collector, and ensure good safety performance of the battery.

In addition, when the conductive layer is a metal conductive layer, the room-temperature Young's modulus of the support layer preferably satisfies: 20 GPa≥E≥1.9 GPa. Preferably, 20 GPa≥E≥4 GPa.

In this application, a method for testing the room-temperature Young's modulus of the support layer is as follows:

A support layer sample is taken and cut into pieces of 15 mm×200 mm. A thickness h (µm) of the cut sample is measured with a micrometer. A Gotech tensile machine is used at a room temperature and an ambient pressure to carry out a tensile test for the cut sample. An initial position is set, and the cut sample is retained 50 mm in length between clamps. Stretching is carried out at a speed of 50 mm/min. Load L (N) and displacement y (mm) of the equipment are recorded when the cut sample is stretched to break. In this case, stress ε=L/(15×h)×1000, and strain η=y/50×100. A stress-strain curve is drawn, and a curve in an initial linear zone is taken, where a slope of this curve is the Young's modulus E.

Because metal is more rigid than polymer or polymer composite materials, that is, the deformation is relatively small during the roll-in process of the electrode plate processing, in order to ensure that a deformation difference between the support layer and the conductive layer is not so large that the conductive layer is tore, the room-temperature Young's modulus of the support layer should preferably satisfy: 20 GPa≥E≥1.9 GPa, so that the support layer can have a specified rigidity, and rigidity matching between the support layer and the conductive layer can be further improved. This ensures that the difference in the deformations of the supporting layer and the conductive layer will not be too large during processing of the current collector and the electrode plate.

Because the support layer has a specified rigidity (20 GPa≥E≥1.9 GPa), the current collector is not easy to deform or stretch too much during the processing of the current collector and the electrode plate, so that the support layer and the conductive layer can be firmly bonded, is not easy to detach, and can prevent damage to the conductive layer caused by the conductive layer being "forced" to stretch. In addition, the current collector in this application has some tenacity, thereby ensuring that the current collector and the electrode plate have some capabilities to withstand deformation and are not prone to strip breakage.

However, the Young's modulus of the support layer cannot be too large; otherwise, the rigidity is too strong, which will cause reeling and winding difficulties, and poor workability. When 20 GPa≥E, the support layer can be guaranteed to have some flexibility, and the electrode plates can also have an ability to withstand deformation.

In addition, a thermal shrinkage of the support layer at 90° C. is preferably not more than 1.5%, to better ensure thermal stability of the current collector during the processing of the electrode plate.

Protection Layer of the Current Collector

In some preferred embodiments of this application, the current collector is further provided with a protection layer. The protection layer is provided on one surface of the conductive layer of the current collector or provided on two surfaces of the conductive layer of the current collector, that is, a surface of the conductive layer farther away from the support layer and a surface facing the support layer.

The protection layer may be a metal protection layer or a metal oxide protection layer. The protection layer can prevent the conductive layer of the current collector from being damaged by chemical corrosion or mechanical damage, and can also enhance the mechanical strength of the current collector, thereby improving current flow capacity of the current collector and the electrode plate.

Preferably, the protection layer is provided on two surfaces of the conductive layer of the current collector. A lower protection layer of the conductive layer (that is, the protection layer provided on the surface of the conductive layer facing the support layer) cannot only prevent damage to the conductive layer and enhance the mechanical strength of the current collector, but also enhance the bonding force between the support layer and the conductive layer to prevent peeling (that is, the separation of the support layer from the conductive layer).

The technical effect of an upper protection layer of the conductive layer (that is, the protection layer provided on the surface of the conductive layer farther away from the support layer) is mainly to prevent the conductive layer from being damaged and corroded during processing (for example, electrolyte solution infiltration and roll-in may affect the surfaces of the conductive layer). In the electrode plate of this application, a conductive primer coating layer is used to mend the cracks that may occur in the conductive layer during the processes such as roll-in and winding, enhance the conductivity, and make up for the composite current collector as the current collector. Therefore, the upper protection layer of the conductive layer can cooperate with the conductive primer coating layer to further provide protection for the conductive layer, thereby jointly improving the conductive effect of the composite current collector used as the current collector.

In virtue of the good conductivity, the metal protection layer cannot only further improve the mechanical strength and corrosion resistance of the conductive layer, but also reduce the polarization of the electrode plate. The material of the metal protection layer is, for example, selected from at least one of nickel, chromium, a nickel-based alloy, and a copper-based alloy, and preferably, nickel or the nickel-based alloy.

The nickel-based alloy is an alloy formed by adding one or more other elements to pure nickel as the matrix. Preferably, the material of the metal protection layer is the nickel-chromium alloy. The nickel-chromium alloy is an alloy formed of metallic nickel and metallic chromium. Optionally, a molar ratio of nickel to chromium is 1:99 to 99:1.

The cooper-based alloy is an alloy formed by adding one or more other elements to a pure cooper matrix. Preferably, the material of the metal protection layer is a copper-nickel alloy. Optionally, in the copper-nickel alloy, a molar ratio of nickel to copper is 1:99 to 99:1.

When a metal oxide is selected for the protection layer, due to its low ductility, large specific surface area, and high hardness, it can also form effective support and protection for the conductive layer, and have a good technical effect on improving bonding force between the support layer and the conductive layer. The material of the metal oxide protection layer is, for example, selected from at least one of aluminum oxide, cobalt oxide, chromium oxide, and nickel oxide.

When the current collector is used as a positive electrode current collector, the protection layer of the composite current collector according to this application preferably adopts a metal oxide to achieve the technical effects of good support and protection while further improving safety performance of the positive electrode plate and the battery. When the current collector is used as a negative electrode current collector, the protection layer of the composite current collector according to this application preferably adopts metal to achieve technical effects of good support and protection while further improving conductivity of the electrode plate and dynamic performance of the battery, to reduce polarization of the battery. When the current collector is used as a negative electrode current collector, the protection layer of the composite current collector according to this application is more preferably a double-layered protection layer containing a metal protection layer and a metal oxide protection layer. Preferably, the metal protection layer is provided on the surface of the conductive layer and the metal oxide protection layer is further provided on a surface of the metal protection layer. The double-layered protection layer can better improve the conductivity, corrosion resistance, and anti-mechanical damage of the negative electrode current collector.

A thickness of the protection layer is D3, and D3 preferably satisfies: $D3 \leq \frac{1}{10} \times D2$, and 1 nm≤D3≤200 nm. If the protection layer is too thin, it is not enough to protect the conductive layer; and if the protection layer is too thick, the weight energy density and the volumetric energy density of the battery will be reduced. More preferably, 5 nm≤D3≤500 nm, further preferably 10 nm≤D3≤200 nm, and most preferably 10 nm≤D3≤50 nm.

The materials of the protection layers on the two surfaces of the conductive layer may be the same or different, and the thicknesses of the protection layers may be the same or different.

Preferably, the thickness of the lower protection layer is less than the thickness of the upper protection layer to help improve the weight energy density of the battery.

Further optionally, a proportional relationship between the thickness D3" of the lower protection layer and the thickness D3' of the upper protection layer is: $\frac{1}{2} \times D3' \leq D3'' \leq \frac{4}{5} \times D3'$.

When the current collector is a positive electrode current collector, aluminum is usually used as the material of the conductive layer, and a metal oxide material is preferably selected for the lower protection layer. Compared with the choice of metal used for the lower protection layer, the metal oxide material has a larger resistance. Therefore, this type of lower protection layer can further increase the resistance of the positive electrode current collector to some extent, thereby further increasing the short circuit resistance of the battery in the event of a short circuit in an abnormal case, and improving the safety performance of the battery. In addition, because the specific surface area of the metal oxide is larger, the bonding force between the lower protection layer of the metal oxide material and the support layer is enhanced. Moreover, because the specific surface area of the metal oxide is larger, the lower protection layer can increase the roughness of the support layer surface, and enhance the bonding force between the conductive layer and the supporting layer, thereby increasing the overall strength of the current collector.

When the current collector is a negative electrode current collector, copper is usually used as the material of the conductive layer, and a metal material is preferably selected for the protection layer. More preferably, on the basis of including at least one metal protection layer, at least one of the lower protection layer and the lower protection layer further includes a metal oxide protection layer, to simultaneously improve the conductivity and interface bonding force of the negative electrode composite current collector.

Current Collector

FIG. 1 to FIG. 8 show schematic structural diagrams of current collectors used in electrode plates according to some embodiments of this application.

Schematic diagrams of a positive electrode current collector are shown in FIG. 1 to FIG. 4.

In FIG. 1, a positive electrode current collector 10 includes a support layer 101 of the positive electrode current collector and conductive layers 102 of the positive electrode current collector provided on two opposite surfaces of the support layer 101 of the positive electrode current collector, and further includes protection layers 103 of the positive electrode current collector provided on lower surfaces of the conductive layers 102 of the positive electrode current collector (that is, surfaces facing the support layer 101 of the positive electrode current collector), that is, lower protection layers.

Figure 2:
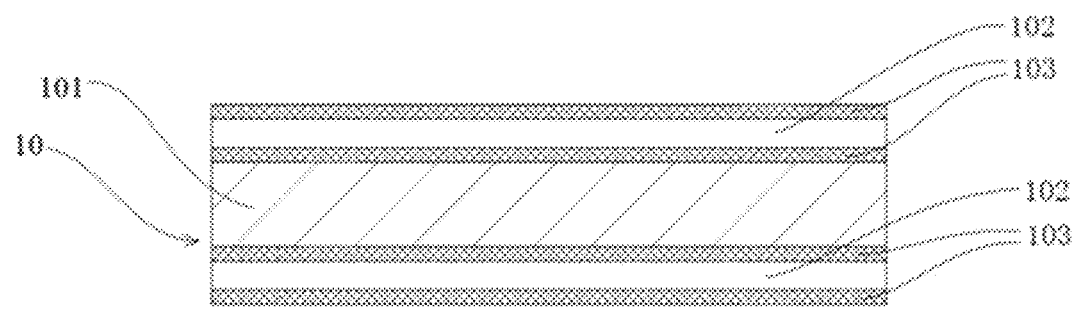
FIG. 2 is a schematic structural cross-sectional view of a positive electrode current collector according to another embodiment of this application.

In FIG. 2, a positive electrode current collector 10 includes a support layer 101 of the positive electrode current collector and conductive layers 102 of the positive electrode current collector provided on two opposite surfaces of the support layer 101 of the positive electrode current collector, and further includes protection layers 103 of the positive electrode current collector provided on two opposite surfaces of the conductive layer 102 of the positive electrode current collector, that is, a lower protection layer and an upper protection layer.

Figure 3:
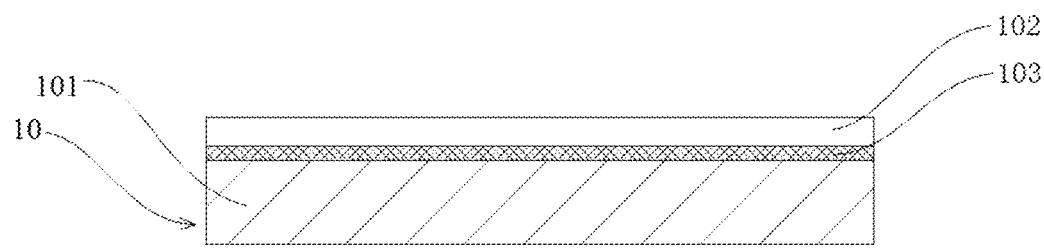
FIG. 3 is a schematic structural cross-sectional view of a positive electrode current collector according to another embodiment of this application.

In FIG. 3, a positive electrode current collector 10 includes a support layer 101 of the positive electrode current collector and a conductive layer 102 of the positive electrode current collector that is provided on one surface of the support layer 101 of the positive electrode current collector, and further includes a protection layer 103 of the positive electrode current collector that is provided on a surface of the conductive layer 102 of the positive electrode current collector facing the support layer 101 of the positive electrode current collector, that is, a lower protection layer.

Figure 4:
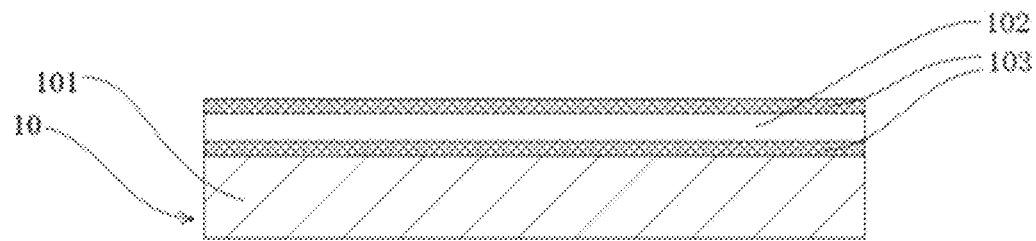
FIG. 4 is a schematic structural cross-sectional view of a positive electrode current collector according to another embodiment of this application.

In FIG. 4, a positive electrode current collector 10 includes a support layer 101 of the positive electrode current collector and a conductive layer 102 of the positive electrode current collector that is provided on one surface of the support layer 101 of the positive electrode current collector, and further includes protection layers 103 of the positive electrode current collector that are provided on two opposite surfaces of the conductive layer 102 of the positive electrode current collector, that is, a lower protection layer and an upper protection layer.

Similarly, the schematic diagrams of a negative electrode current collector are shown in FIG. 5 to FIG. 8.

Figure 5:
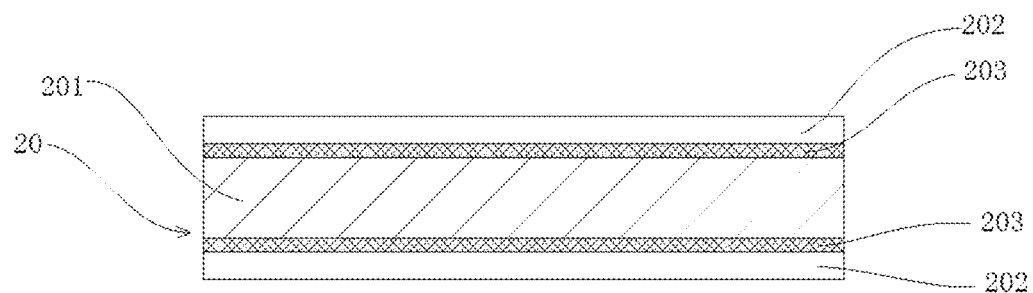
FIG. 5 is a schematic structural cross-sectional view of a negative electrode current collector according to an embodiment of this application.

In FIG. 5, a negative electrode current collector 20 includes a support layer 201 of the negative electrode current collector and conductive layers 202 of the negative electrode current collector provided on two opposite surfaces of the support layer 201 of the negative electrode current collector, and further includes protection layers 203 of the negative electrode current collector provided on surfaces of the conductive layers 202 of the negative electrode current collector facing the support layer 201 of the negative electrode current collector, that is, lower protection layers.

Figure 6:
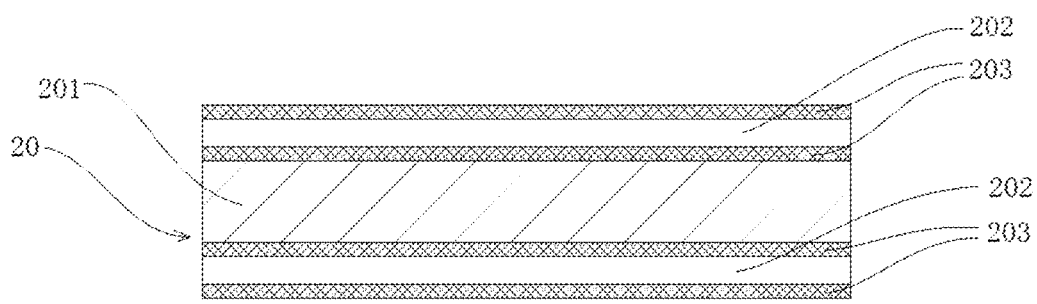
FIG. 6 is a schematic structural cross-sectional view of a negative electrode current collector according to another embodiment of this application.

In FIG. 6, a negative electrode current collector 20 includes a support layer 201 of the negative electrode current collector and conductive layers 202 of the negative electrode current collector provided on two opposite surfaces of the support layer 201 of the negative electrode current collector, and further includes protection layers 203 of the negative electrode current collector provided on two opposite surfaces of the conductive layer 202 of the negative electrode current collector, that is, a lower protection layer and an upper protection layer.

Figure 7:
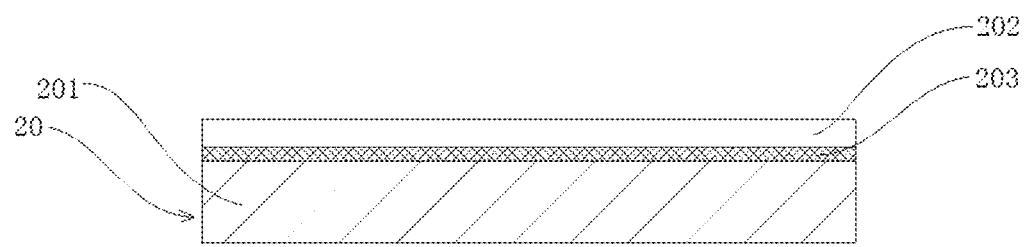
FIG. 7 is a schematic structural cross-sectional view of a negative electrode current collector according to another embodiment of this application.

In FIG. 7, a negative electrode current collector 20 includes a support layer 201 of the negative electrode current collector and a conductive layer 202 of the negative electrode current collector provided on one surface of the support layer 201 of the negative electrode current collector, and further includes a protection layer 203 of the negative electrode current collector provided on the conductive layer 202 of the negative electrode current collector facing the support layer 201 of the negative electrode current collector, that is, a lower protection layer.

Figure 8:
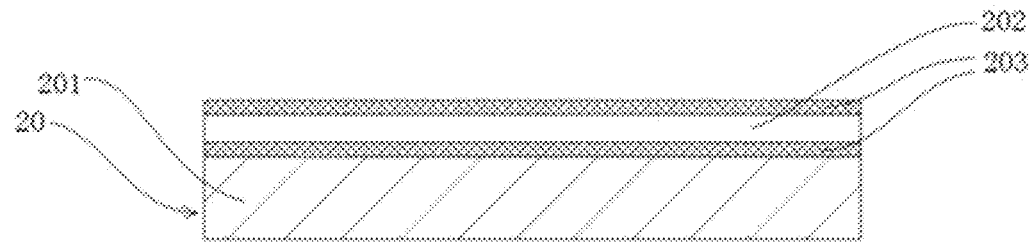
FIG. 8 is a schematic structural cross-sectional view of a negative electrode current collector according to another embodiment of this application.

In FIG. 8, a negative electrode current collector 20 includes a support layer 201 of the negative electrode current collector and a conductive layer 202 of the negative electrode current collector provided on one surface of the support layer 201 of the negative electrode current collector, and further includes protection layers 203 of the negative electrode current collector provided on two opposite surfaces of the conductive layer 202 of the negative electrode current collector, that is, a lower protection layer and an upper protection layer.

The materials of the protection layers on the two opposite surfaces of the conductive layer may be the same or different, and the thicknesses may be the same or different.

For the current collectors used for the electrode plate according to this application, a conductive layer may be separately provided on two opposite surfaces of the support layer, as shown in FIG. 1, FIG. 2, FIG. 5, and FIG. 6; or a conductive layer may be provided on only one surface of the support layer, as shown in FIG. 3, FIG. 4, FIG. 7, and FIG. 8. (Although the figure shows the case in which only the lower protection layer is included, it should be understood that only the upper protection layer may alternatively be included).

In addition, although the composite current collectors used for the electrode plate in this application preferably include the protection layers of the current collectors shown in FIG. 1 to FIG. 8, it should be understood that the protection layer of the current collector is not a necessary structure of the current collector. In some embodiments, the used current collector may not include the protection layer of the current collector.

Electrode Active Material Layer of an Electrode Plate

The electrode active material layer of the electrode plate is provided on a main portion (which is referred to as the film zone of the current collector in this application) of one or two surfaces of the composite current collector. In addition, a conductive primer coating layer (discussed later) is further provided between the composite current collector and the electrode active material layer. The electrode active material layer used for the electrode plate in this application generally includes an electrode active material, a binder, and a conductive agent. The electrode active material layer may further include other optional additives or auxiliaries as needed.

For the positive electrode plate, various electrode active materials commonly used in the art (that is, positive electrode active materials) may be selected. For example, for lithium batteries, the positive electrode active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode active substances of the lithium-ion battery. One type of these positive electrode active materials may be used alone, or two or more types may be used in combination. Preferably, the positive electrode active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM 333), $LiNi_{0.5}Co_{0.2}Mn_{0.3}O_2$ (NCM 523) $LiNi_{0.6}Co_{0.2}O_2$ (NDM 622), $LiNi_{0.8}Co_{0.1}Mn_{0.1}O_2$ (NCM 811), $LiNi_{0.85}Co_{0.15}Al_{0.05}O_2$, $LiFePO_4$, and $LiMnPO_4$.

For the negative electrode plate, various electrode active materials commonly used in the art (that is, negative electrode active materials) may be selected. For example, for the lithium battery, a negative electrode active material may be selected from carbon materials such as graphite (artificial graphite or natural graphite), conductive carbon black, and carbon fiber, metal or semimetal materials or alloys thereof such as Si, Sn, Ge, Bi, Sn, and In, lithium nitride or lithium oxide, lithium metal or a lithium alloy, and the like.

For the electrode plate in this application, an average particle size D50 of the active material in the electrode active material layer is preferably 5 μm to 15 μm. If D50 is too small, the porosity of the electrode plate after compaction is small, which is not conducive to the infiltration of the electrolyte, and its large specific surface area is likely to cause more side reactions with the electrolyte, reducing the reliability of the battery; if D50 is too large, it is easy to cause great damage to the conductive primer coating layer and the composite current collector during the compaction process of the electrode plate. D50 is a corresponding particle size when a cumulative volume percentage of the active material reaches 50%, that is, a median particle size in volume distribution. D50 may be measured by using, for example, a laser diffraction particle size distribution measuring instrument (for example, Malvern Mastersizer 3000).

The conductive agent in the electrode active material layer may be at least one of a conductive carbon material and a metal material. The conductive carbon material is selected from at least one of zero-dimensional conductive carbon such as acetylene black or conductive carbon black, one-dimensional conductive carbon such as carbon nanotube, two-dimensional conductive carbon such as conductive graphite or graphene, and three-dimensional conductive carbon such as reduced graphene oxide, and the metal material is selected from at least one of aluminum powder, iron powder, and silver powder.

The binder in the electrode active material layer may be selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, and polyacrylate-polyacrylonitrile copolymer.

It is known to a person skilled in the art, the needed electrode active material layer is obtained by applying slurry formed of the electrode active material, the conductive agent, and the binder onto the electrode current collector (or onto the primer coating layer of the electrode current collector in advance), and then performing post-processing such as drying.

A conventional electrode plate can be coated with one or more electrode active material layers, but in either case, the electrode active material layer is uniformly coated in a coating zone on a surface of the entire electrode plate, and a cold pressing (roll-in) operation is also performed on the surface of the entire electrode plate. Therefore, the resulting electrode active material layer on the electrode plate has basically the same compacted density with no significant difference.

For the electrode plate according to some preferred embodiments of this application, viewed in a width direction of the coated surface of the electrode plate, based on compacted density, the electrode active material layer includes 2n+1 (n=1, 2, or 3) zones, and compacted density of a middle zone is greater than compacted density of zones on both sides. Preferably, n=1. A preferred embodiment is used as an example: Based on compacted density, the electrode active material layer includes three zones, and compacted density of a middle zone is greater than compacted density of zones on two sides. Because compacted density of the zones on both sides of the electrode plate is low after the process such as the cold pressing (roll-in), and compacted density of the middle zone is high, that is, pressure on the zones on the both sides of the electrode plate is lower than that on the middle zone in the process such as the cold pressing (roll-in), edge warping and curvature of the composite current collector and the electrode plate that are caused by the rebound of the composite current collector during the electrode plate processing may be prevented, which is conducive to formation of the electrode plate with a flat surface, thereby helping to ensure electrochemical performance of the electrochemical apparatus. In addition, this helps protect the conductive layer from damage, thereby ensuring a good current flow capacity of the electrode plate.

In this application, the "length direction" and "width direction" of the surface of the electrode plate respectively refer to two dimensions of the surface. The length direction is a main dimension direction (that is, a direction with a relatively large magnitude), and the width direction is a secondary dimension direction (that is, a direction with a relatively small magnitude). Generally, the length direction is consistent with a coating direction of each material layer (for example, the electrode active material layer) during the electrode plate processing, and is also consistent with a winding direction of the electrode plate during a manufacturing process of the electrochemical apparatus (for example, the battery); and the width direction is perpendicular to the length direction.

To form the 2n+1 zones of the active material layer based on the compacted density according to this application, a partition coating method may be used. That is, the surface of the electrode plate is separated into different zones (or boundaries) by using baffle plates or spacers. Each zone is applied with an electrode active material slurry of different weight. In this way, after roll-in, zones of the active material layer that have different compacted density are formed. In addition, zones on both sides preferably have identical compacted density. Such design helps to better ensure flatness of the electrode plate.

In the electrode plates according to some preferred embodiments of this application, based on a total weight of the electrode active material layer, the binder contained in the electrode active material layer is preferably not less than 1 wt %, more preferably, not less than 1.5 wt %, and most preferably not less than 2 wt %. For the electrode plate in this application, when the percentage of the binder contained in the electrode active material layer is relatively high, bonding force between the active material layer and the composite current collector can be enhanced, to suppress deterioration of the bonding force between the composite current collector and the electrode active material layer that is caused by relatively great rebound of the support layer during processing, thereby ensuring that the electrode active material layer is not prone to be separated from the composite current collector. If the bonding force between the composite current collector and the electrode active material layer is insufficient, internal resistance of the battery is relatively great, polarization is increased, and electrochemical performance is relatively poor. When the bonding force is relatively strong, in an abnormal case such as nail penetration, the active material layer can efficiently wrap metal burrs generated in the conductive layer, to improve nail penetration safety performance of the battery. When the binder content is maintained within such range, the bonding force between the active material layer and the current collector is relatively strong, and as a result, in an abnormal case such as nail penetration, the active material layer can more efficiently wrap the metal burrs generated in the conductive layer to improve the nail penetration safety performance of the battery.

FIG. 9 to FIG. 16 are schematic structural cross-sectional views of an electrode plate in a film zone according to some embodiments of this application.

Figure 9:
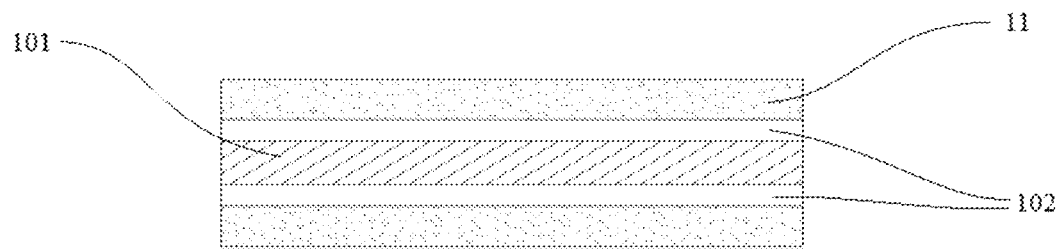
FIG. 9 is a schematic structural cross-sectional view of a positive electrode plate in a film zone according to an embodiment of this application.
Figure 12:
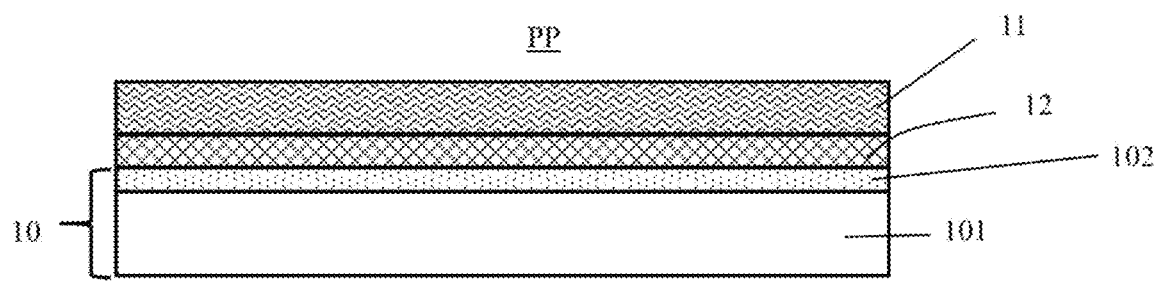
FIG. 12 is a schematic structural cross-sectional view of a positive electrode plate in a film zone according to another embodiment of this application.

FIG. 9 and FIG. 12 are schematic diagrams of a positive electrode plate in a film zone.

In FIG. 9, a positive electrode plate in the film zone includes a positive electrode current collector 10, and positive electrode active material layers 11 that are provided on two opposite surfaces of the positive electrode current collector 10. The positive electrode current collector 10 includes a support layer 101 of the positive electrode current collector, conductive layers 102 of the positive electrode current collector that are provided on two opposite surfaces of the support layer 101 of the positive electrode current collector, and a positive electrode protection layer 103/ positive electrode protection layers 103 (not shown in the figure) that is/are provided on one side or two sides of the positive electrode conductive layer 102.

Figure 10:
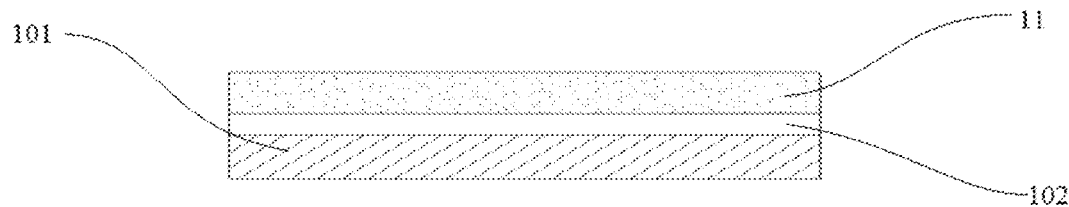
FIG. 10 is a schematic structural cross-sectional view of a positive electrode plate in a film zone according to another embodiment of this application.

In FIG. 10, a positive electrode plate in the film zone includes a positive electrode current collector 10, and a positive electrode active material layer 11 that is provided on one surface of the positive electrode current collector 10. The positive electrode current collector 10 includes a support layer 101 of the positive electrode current collector, a conductive layer 102 of the positive electrode current collector that is provided on one surface of the support layer 101 of the positive electrode current collector, and a positive electrode protection layer 103/positive electrode protection layers 103 (not shown in the figure) that is/are provided on one side or two sides of the positive electrode conductive layer 102.

Figure 11:
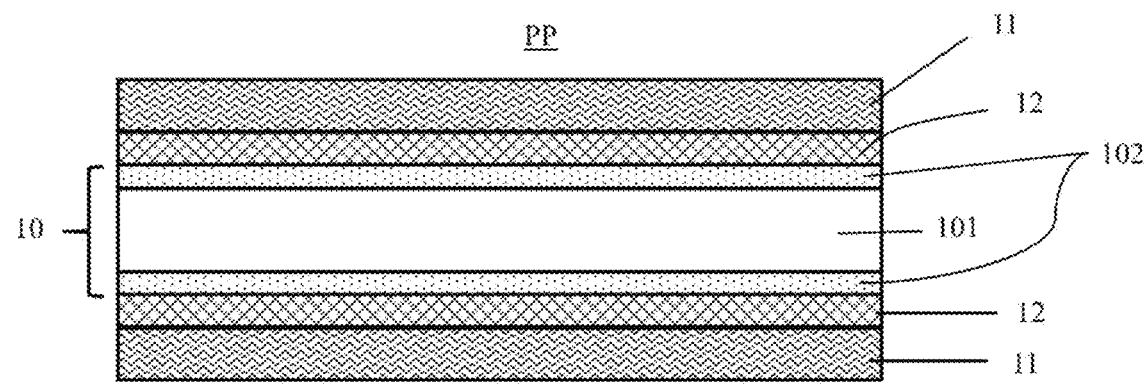
FIG. 11 is a schematic structural cross-sectional view of a positive electrode plate in a film zone according to another embodiment of this application.

In FIG. 11, a positive electrode plate PP in the film zone includes a positive electrode current collector 10, and a conductive primer coating layer 12 and a positive electrode active material layer 11 that are each provided on two opposite surfaces of the positive electrode current collector 10. The positive electrode current collector 10 includes a support layer 101 of the positive electrode current collector and conductive layers 102 of the positive electrode current collector that are provided on two opposite surfaces of the support layer 101 of the positive electrode current collector.

In FIG. 12, a positive electrode plate PP in the film zone includes a positive electrode current collector 10, and a conductive primer coating layer 12 and a positive electrode active material layer 11 that are provided on one surface of the positive electrode current collector 10. The positive electrode current collector 10 includes a support layer 101 of the positive electrode current collector and a conductive layer 102 of the positive electrode current collector that is provided on one surface of the support layer 101 of the positive electrode current collector.

Figure 13:
FIG. 13 is a schematic structural cross-sectional view of a negative electrode plate in a film zone according to an embodiment of this application.
Figure 16:
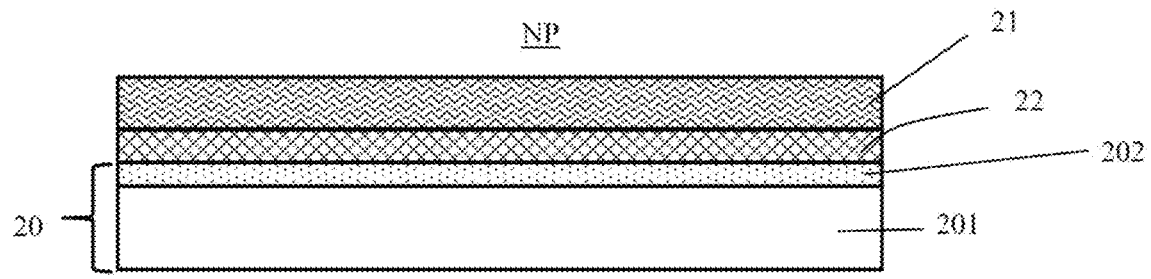
FIG. 16 is a schematic structural cross-sectional view of a negative electrode plate in a film zone according to another embodiment of this application.

FIG. 13 and FIG. 16 are schematic diagrams of a negative electrode plate in a film zone.

In FIG. 13, a negative electrode plate in the film zone includes a negative electrode current collector 20, and negative electrode active material layers 21 that are provided on two opposite surfaces of the negative electrode current collector 20. The negative electrode current collector 20 includes a support layer 201 of the negative electrode current collector, conductive layers 202 of the negative electrode current collector that are provided on two opposite surfaces of the support layer 201 of the negative electrode current collector, and a negative electrode protection layer 203/negative electrode protection layers 203 (not shown in the figure) that is/are provided on one side or two sides of the negative electrode conductive layer 202.

Figure 14:
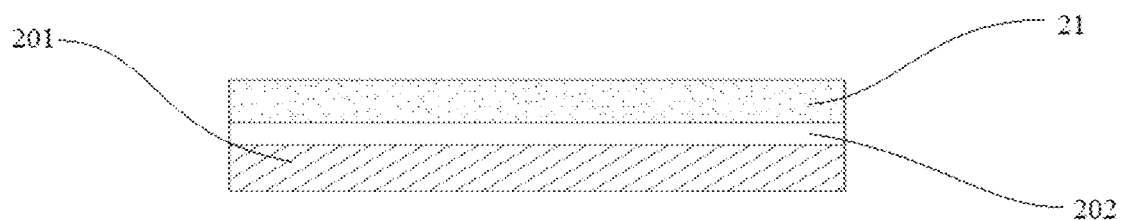
FIG. 14 is a schematic structural cross-sectional view of a negative electrode plate in a film zone according to another embodiment of this application.

In FIG. 14, a negative electrode plate in the film zone includes a negative electrode current collector 20, and a negative electrode active material layer 21 that is provided on one surface of the negative electrode current collector 20. The negative electrode current collector 20 includes a support layer 201 of the negative electrode current collector, a conductive layer 202 of the negative electrode current collector that is provided on one surface of the support layer 201 of the negative electrode current collector, and a negative electrode protection layer 203/negative electrode protection layers 203 (not shown in the figure) that is/are provided on one side or two sides of the negative electrode conductive layer 202.

Figure 15:
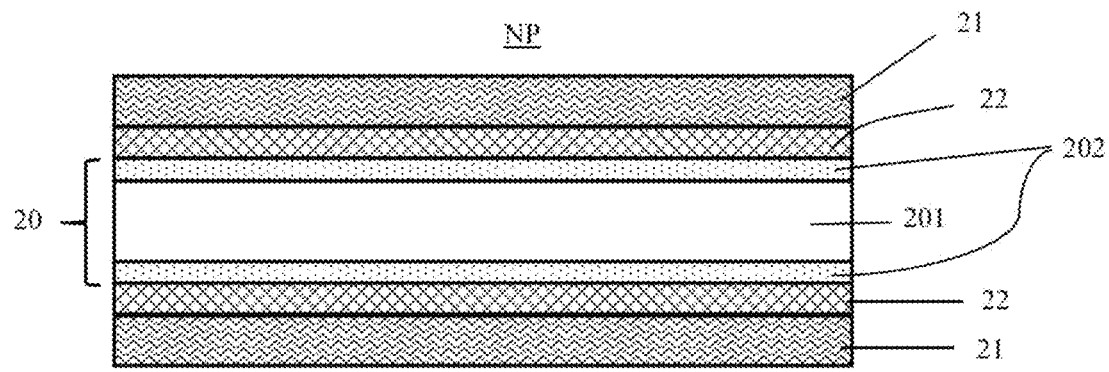
FIG. 15 is a schematic structural cross-sectional view of a negative electrode plate in a film zone according to another embodiment of this application.

In FIG. 15, a negative electrode plate NP in the film zone includes a negative electrode current collector 20, and a conductive primer coating layer 22 and a negative electrode active material layer 21 that are separately provided on two opposite surfaces of the negative electrode current collector 20. The negative electrode current collector 20 includes a support layer 201 of the negative electrode current collector and conductive layers 202 of the negative electrode current collector that are provided on two opposite surfaces of the support layer 201 of the negative electrode current collector.

In FIG. 16, a negative electrode plate NP in the film zone includes a negative electrode current collector 20, and a conductive primer coating layer 22 and a negative electrode active material layer 21 that are provided on one surface of the negative electrode current collector 20. The negative electrode current collector 20 includes a support layer 201 of the negative electrode current collector and a conductive layer 202 of the negative electrode current collector that is provided on one surface of the support layer 201 of the negative electrode current collector.

As shown in FIG. 9 to FIG. 16, the electrode active material layer may be provided on one surface of the current collector, or may be provided on two surfaces of the current collector.

A person skilled in the art can understand that, when a current collector provided with double-sided conductive layers is used, the electrode plate may be obtained through double-sided coating (that is, electrode active material layers are provided on two surfaces of the current collector), or only single-sided coating (that is, the electrode active material layer is only provided on one surface of the current collector); and when the current collector provided with only a single-sided conductive layer is used, the electrode plate may be obtained only through single-sided coating, and the electrode active material layer (and the conductive primer coating layer) may only be coated on the side of the current collector provided with the conductive layer.

Conductive Primer Layer of the Electrode Plate

In this application, the surface of the composite current collector can be separated into three zones based on applied materials and locations: a film zone on the main body portion for disposing the electrode active material layer, an transfer welding zone at the edge for welding the electrical connection member (also referred to as the tab), and an extension zone serving as a transition zone between the former two.

In this application, a conductive primer coating layer may be provided on the composite current collector. Specifically, in this application, the conductive primer coating layer is not only provided between the conductive layer and the electrode active material layer in the film zone (also referred to as a film layer) of the current collector, but also provided on the surface of the conductive layer in the extension zone of the current collector. The conductive primer coating layer may or may not be provided on the surface (usually under a welding mark) of the conductive layer of the current collector in the transfer welding zone (for ease of operation, if the tab is welded before the material layer is provided, the conductive primer coating layer may not be provided. By contrast, if the material layer is provided before the tab is welded, the conductive primer coating layer may or may not be provided).

According to requirements, distribution layout of the conductive primer coating layer on the surfaces of the film zone and extension zone of the composite current collector may be of a plurality of forms that are described in detail with reference to FIG. 17A, FIG. 17B, FIG. 17C, and FIG. 17D.

Figure 17A:
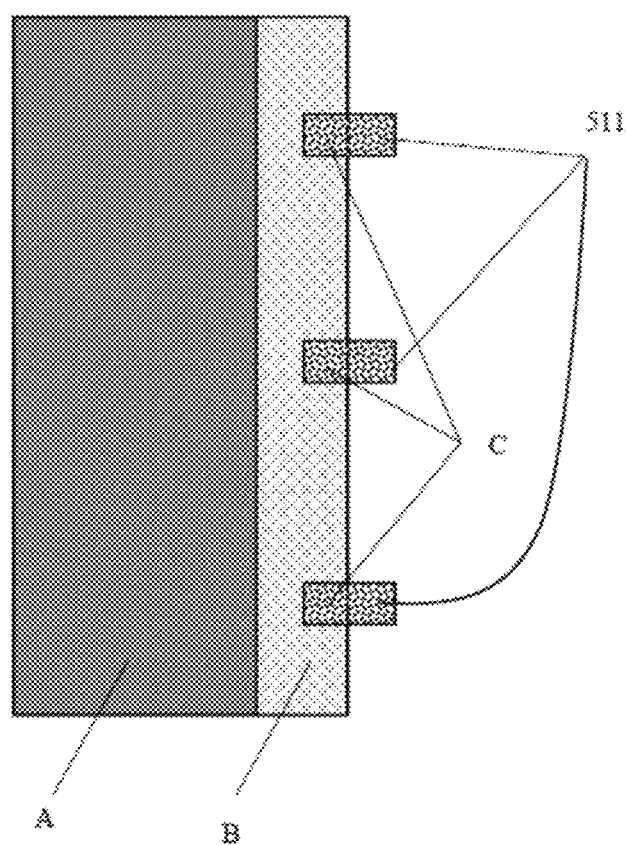
FIG. 17A is a schematic structural vertical view of a positive electrode plate according to an embodiment of this application.

FIG. 17A is an example vertical view of a positive electrode plate according to an embodiment of this application. As shown in the figure, the positive electrode plate includes a composite current collector 10 and a plurality of electrical connection members (tabs) 511 electrically connected to the current collector 10 through welding at an edge. A conductive primer coating layer and an active material layer are provided in a film zone A of a main body portion of the current collector 10. A zone in which the current collector 10 and the tabs 511 are welded together is an transfer welding zone C. A transition zone outside the film zone A and the transfer welding zone C is an extension zone B. A conductive primer coating layer is also provided on a surface of the extension zone B.

Figure 17B:
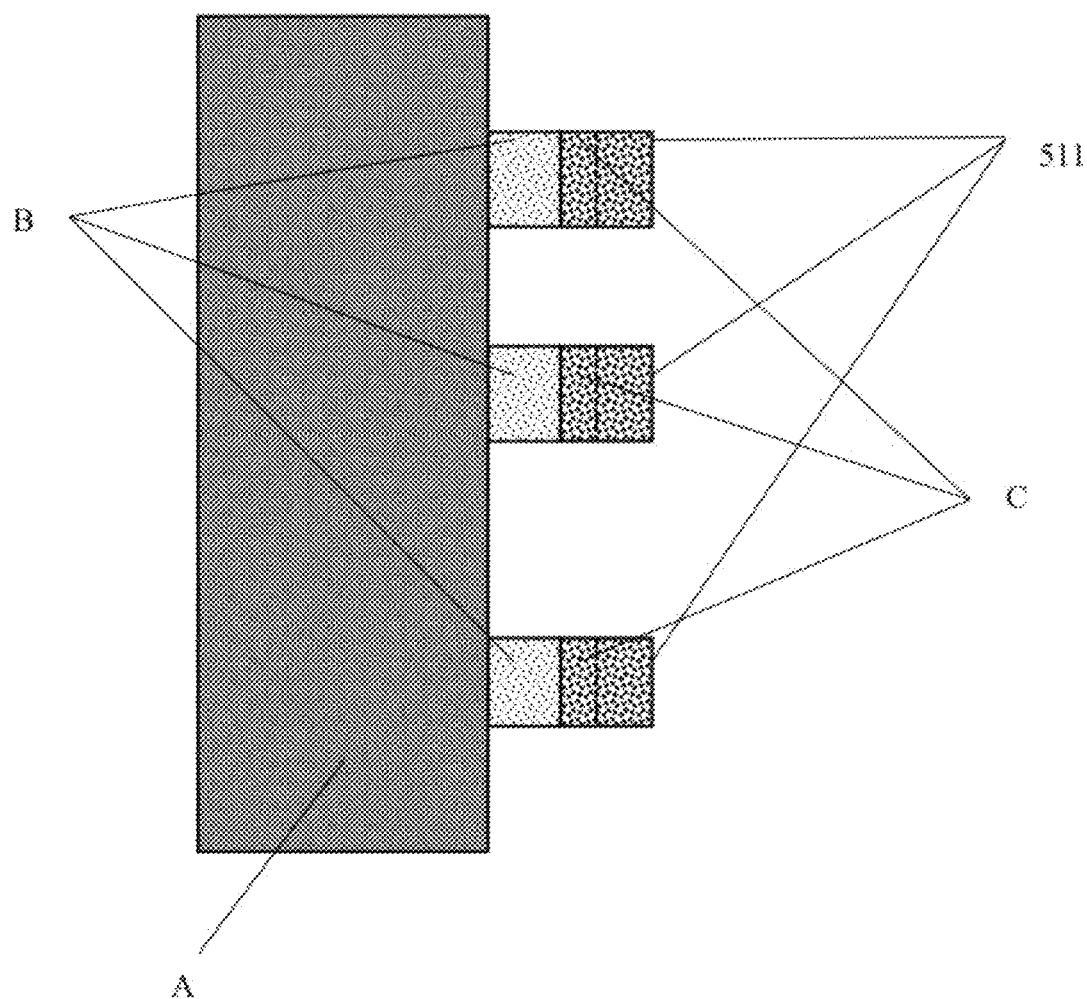
FIG. 17B is a schematic structural vertical view of a positive electrode plate according to another embodiment of this application.

FIG. 17B is an example vertical view of a positive electrode plate according to another embodiment of this application. As shown in the figure, the positive electrode plate includes a composite current collector 10 and a plurality of electrical connection members (tabs) 511 electrically connected to the current collector 10 through welding at several protrusions at an edge. A conductive primer coating layer and an active material layer are provided in a film zone A of a main body portion of the current collector 10 (the entire main body portion is used as the film zone A). The several protrusions of the current collector 10 are used as an extension zone B. A conductive primer coating layer is provided on a surface of the extension zone B. A zone in which the tabs 511 overlap with the extension zone B is an transfer welding zone C.

Figure 17C:
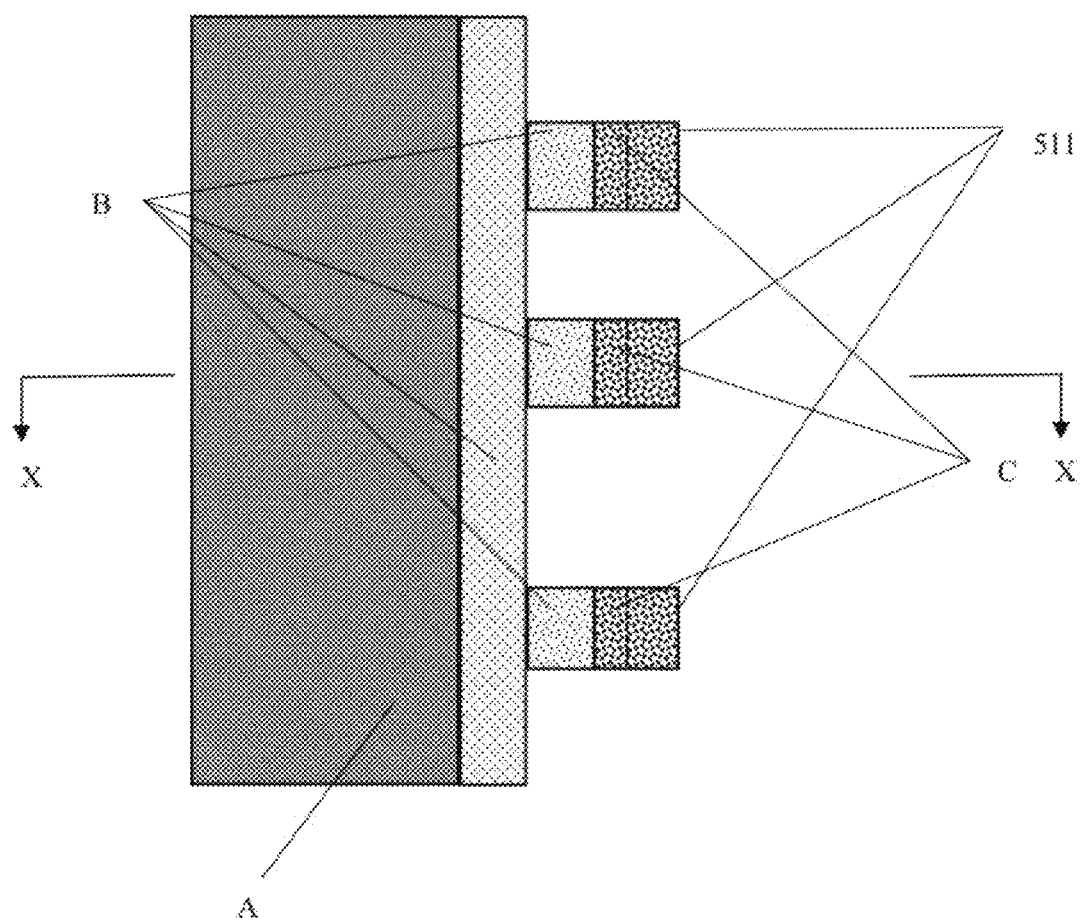
FIG. 17C is a schematic structural vertical view of a positive electrode plate according to another embodiment of this application.

FIG. 17C is an example vertical view of a positive electrode plate according to another embodiment of this application. As shown in the figure, the positive electrode plate includes a composite current collector 10 and a plurality of electrical connection members (tabs) 511 electrically connected to the current collector 10 through welding at several protrusions at an edge. Most of the main body portion of the current collector 10 is used as a film zone A, but a strip-shaped zone is left at the edge and the several protrusions are used as an extension zone B together. A conductive primer coating layer and an active material layer are provided in the film zone A. Only a conductive primer coating layer is provided in the extension zone B. A zone in which the tabs 511 overlap with the extension zone B is an transfer welding zone C.

Figure 17D:
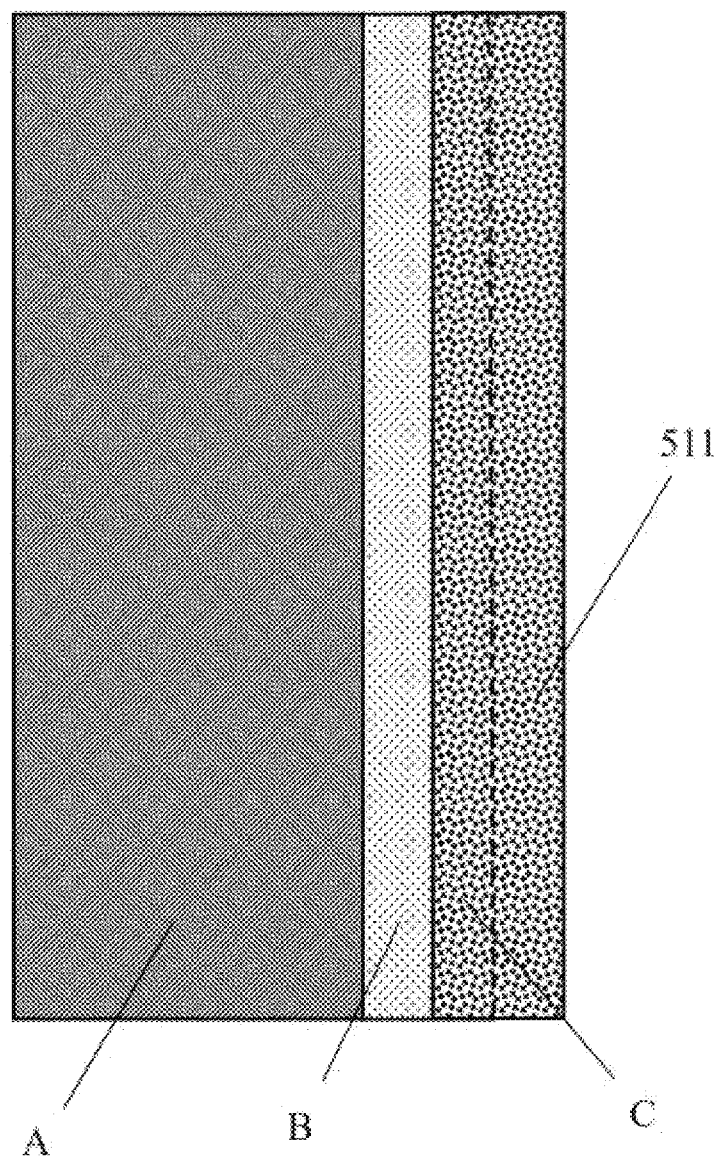
FIG. 17D is a schematic structural vertical view of a positive electrode plate according to another embodiment of this application.

FIG. 17D is an example vertical view of a positive electrode plate according to another embodiment of this application. As shown in the figure, the positive electrode plate includes a composite current collector 10 and a strip-shaped electrical connection member 511 electrically connected to the current collector 10 through welding at an edge. A conductive primer coating layer and an active material layer are provided in a film zone A of a main body portion of the current collector 10. A zone in which the current collector 10 and the electrical connection member 511 are welded together is an transfer welding zone C. A transition zone between the film zone A and the transfer welding zone C is an extension zone B. A conductive primer coating layer is also provided on a surface of the extension zone B.

Figure 17E:
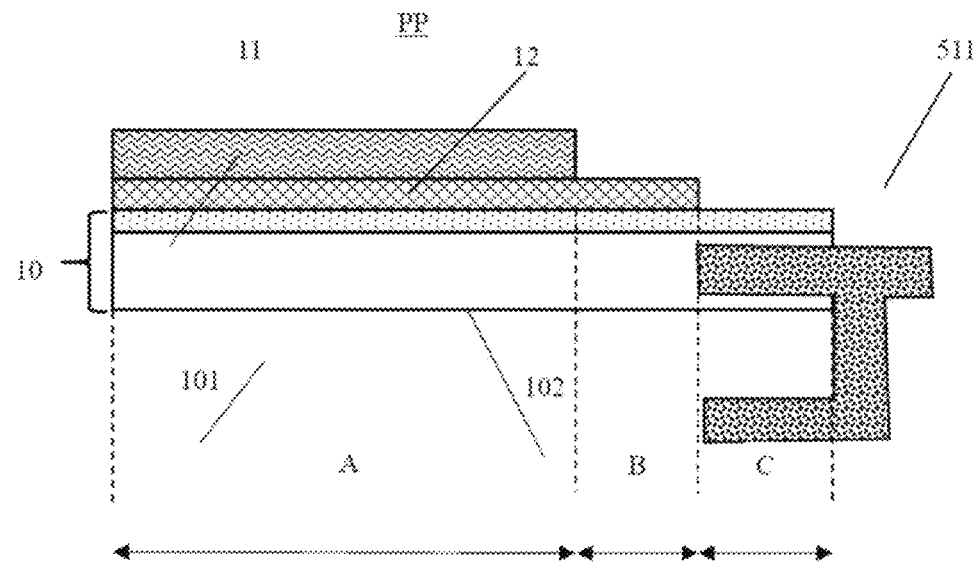
FIG. 17E is a schematic structural cross-sectional view of the positive electrode plate shown in FIG. 17A to FIG. 17D (for example, FIG. 17C) according to some embodiments.

FIG. 17E is an example schematic structural cross-sectional view of the positive electrode plate according to some embodiments in FIG. 17A to FIG. 17D (for example, an X-X cross-sectional view for FIG. 17C). As shown in the figure, the positive electrode plate PP includes a composite current collector 10 and an electrical connection member 511 electrically connected to the current collector 10 through welding. The positive electrode current collector 10 includes a support layer 101 of the positive electrode current collector, a conductive layer 102 of the positive electrode current collector that is provided on one surface of the support layer 101 of the positive electrode current collector, and a positive electrode protection layer 103/positive electrode protection layers 103 (not shown in the figure) that is/are provided on one or two sides of the positive electrode conductive layer 102. In accordance with FIG. 17 C, the positive electrode current collector 10 may be separated into three zones based on different material layers provided on its surface: a film zone A, an extension zone B, and an transfer welding zone C. The film zone A occupies most of the surface of the positive electrode current collector 10 and has a conductive primer coating layer 12 and a positive electrode active material layer 11 formed thereon in sequence. The transfer welding zone C provides an electrical connection interface between the positive electrode current collector 10 and the electrical connection member 511. A conductive primer coating layer 12 is also provided on the surface of the extension zone B (but the positive electrode active material layer 11 is not provided).

FIG. 17A to FIG. 17E are schematic diagrams of positive electrode plates having a single-sided composite current collector with one conductive layer. However, those skilled in the art can understand that the electrode plate in this application can alternatively adopt a double-sided composite current collector with two conductive layers. In this case, the conductive primer coating layer and the positive electrode active material layer are also provided on two surfaces of the composite current collector. In addition, those skilled in the art can understand that the negative electrode plate may also be similarly designed.

In this application, the conductive primer coating layer can improve an interface of the composite current collector and overcome shortcomings such as poor conductivity and current flow capacity of the composite current collector and the conductive layer of the composite current collector being susceptible to damage, improve the electron transfer efficiency, and reduce the resistance between the current collector and the electrode active material layer by effectively mending the surface of the current collector and constructing a conductive network among the current collector, the conductive primer coating layer, and the active substance, thereby effectively reducing the internal direct current resistance in the battery cell, improving the power performance of the battery cell, and ensuring that the battery cell is not prone to phenomena of relatively great polarization and lithium plating during long-term cycling, that is, effectively improving long-term reliability of the battery cell. In addition, this can also improve adhesion between the current collector and an active substance, and ensure that the electrode active material layer is more firmly provided on the surface of the composite current collector. Moreover, both the film zone and the extension zone of the composite current collector are provided with the conductive primer coating layer, which improves the current flow capacity and electrochemical performance of the electrode plate. By improving the interface of the conductive layer, the conductive primer coating layer can make migration of electrons on the entire electrode plate smoother, reducing polarization and increasing the current flow capacity of the electrode plate, and resolving the problems of uneven current distribution on the electrode plate and large local polarization.

The conductive primer coating layer contains a conductive material and a binder. Based on a total weight of the conductive primer coating layer, a percentage of a conductive material by weight is 10% to 99%, preferably, 20% to 80%, or more preferably, 50% to 80%; and a percentage of the binder by weight is 1% to 90%, preferably, 20% to 80%, or more preferably, 20% to 50%. The percentage can help to improve the conductivity of the electrode plate and the bonding force between the current collector and the electrode active material layer. In addition to the conductive material and the binder, the conductive primer coating layer may further contain other optional additives or promoters.

The conductive material is at least one of a conductive carbon material and a metal material. The conductive material in the conductive primer coating layer and the conductive agent in the active material layer may be identical or different.

The conductive carbon material is selected from at least one of zero-dimensional conductive carbon (such as acetylene black or conductive carbon black), one-dimensional conductive carbon (such as carbon nanotube), two-dimensional conductive carbon (such as conductive graphite or graphene), and three-dimensional conductive carbon (such as reduced graphene oxide). The metal material is selected from at least one of aluminum powder, iron powder, and silver powder.

A preferred conductive material includes a one-dimensional conductive carbon material or a two-dimensional conductive carbon material. After the two-dimensional conductive carbon material is added, the two-dimensional conductive carbon material in the conductive primer coating layer can come into "horizontal sliding" during the compaction of the electrode plate, achieving a function of buffering, reducing the damage to the conductive layer of the current collector during the compaction, and reducing cracks. Preferably, a particle size D50 of the two-dimensional conductive carbon material is 0.01 μm to 0.1 μm. Preferably, the two-dimensional conductive carbon material accounts for 1 wt % to 50 wt % of the conductive material. In addition, due to the special morphology of the one-dimensional conductive carbon material, the conductivity of the conductive primer coating layer can be improved after addition. Especially when a specified amount of the conductive material is added, compared with other types of conductive materials, the one-dimensional conductive carbon material can better improve the conductivity of the conductive primer coating layer. Preferably, carbon nanotube is used, and a length-diameter ratio of the carbon nanotube is preferably 1000 to 5000.

Preferably, the conductive material is a mixed material of a zero-dimensional conductive carbon material and a one-dimensional conductive carbon material or a mixed material of a zero-dimensional conductive carbon material and a two-dimensional conductive carbon material.

The binder in the conductive primer coating layer and the binder in the active material layer may be identical or different.

The binder in the conductive primer coating layer is selected from at least one of styrene butadiene rubber, oily polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, and polyacrylate-polyacrylonitrile copolymer.

The binder in the conductive primer coating layer is preferably an aqueous binder, for example, at least one of aqueous PVDF, acrylic acid, polyurethane, polyvinyl alcohol, polyacrylate, polyacrylic-acid-polyacrylonitrile copolymer, and polyacrylate-polyacrylonitrile copolymer. In this way, DCR of the electrochemical apparatus does not increase significantly.

In this application, an "aqueous" polymer material means that the polymer molecular chain is fully extended and dispersed in water, and an "oily" polymer material means that the polymer molecular chain is fully extended and dispersed in an oily solvent. A person skilled in the art understands that the same type of polymer materials can be dispersed in water and oily respectively by using suitable surfactants. That is, by using suitable surfactants, the same type of polymer materials can be classified into aqueous polymer materials and oily polymer materials. For example, a person skilled in the art can replace PVDF with aqueous PVDF or oily PVDF as needed.

A single-sided thickness H of the conductive primer coating layer is preferably: 0.1 μm to 5 μm. Preferably, H/D2 is 0.5:1 to 5:1. If the ratio is too small, the cracks of the conductive layer cannot be effectively reduced or the conductivity of the electrode plate cannot be effectively improved; or if the ratio is too large, not only the weight energy density of the battery is reduced, but also the DCR of the battery is increased, which is not conducive to improvement of the dynamic performance of the battery.

In the electrode plate of this application, the conductive primer coating layer in the film zone of the current collector may be the same as or different from the conductive primer coating layer in the extension zone of the current collector in terms of material composition and thickness.

In a further preferred example of this application, the thickness of the conductive primer coating layer in the extension zone of the composite current collector is greater than the thickness of the conductive primer coating layer in the film zone, or the amount of the conductive material contained in the conductive primer coating layer in the extension zone of the composite current collector is higher than the amount of the conductive material contained in the conductive primer coating layer in the film zone. Such an arrangement can better improve current flow capacity at the extension zone of the current collector, and can ensure that the entire electrode plate has relatively high weight energy density.

Support Protection Layer of the Electrode Plate

Because the composite current collector is adopted, the conductive layer of the current collector in the extension zone is thinner than that of the conventional metal current collector. Therefore, to prevent damage, such as breakage and fracture of the conductive layer, in a preferred embodiment, a support protection layer is also provided on the surface of the conductive primer coating layer in the extension zone of the composite current collector, to enhance the mechanical strength and hardness of the extension zone of the composite current collector, prevent bending and deformation of the extension zone of the current collector, and prevent damage of the conductive layer at the extension zone, so that the current flow capacity of the conductive layer at the extension zone can be improved. The support protection layer is an organic insulation layer or an inorganic insulation layer.

The organic insulation layer can be selected from an insulation tape layer or an insulation glue coating layer. The insulation glue coating layer is, for example, selected from at least one of a polyvinylidene fluoride layer, a polyvinylidene fluoride layer, a vinylidene fluoride-hexafluoropropylene copolymer layer, a styrene butadiene rubber layer, a sodium carboxymethyl cellulose layer, a polyacrylic acid layer, a sodium polyacrylate layer, a polyepoxy ethane layer, and a polyvinyl alcohol layer.

The inorganic insulation layer may be selected from at least one of an aluminum oxide layer, a magnesium oxide layer, a zinc oxide layer, a silicon oxide layer, a titanium oxide layer, a zirconium oxide layer, an aluminum nitride layer, a silicon nitride layer, a calcium fluoride layer, and a barium fluoride layer.

The inorganic insulation layer may include an insulation filler and a binder. The insulation filler is preferably at least one of aluminum oxide, magnesium oxide, zinc oxide, silicon oxide, titanium oxide, zirconium oxide, aluminum nitride, silicon nitride, calcium fluoride, and barium fluoride. The binder is preferably at least one of polyvinylidene fluoride, polyvinylidene fluoride, vinylidene fluoride-hexafluoropropylene copolymer, styrene butadiene rubber, sodium carboxymethyl cellulose, polyacrylic acid, polyethylene oxide, and polyvinyl alcohol. A percentage of the insulation filler contained in the inorganic insulation layer is generally greater than or equal to 50 wt %, to ensure that the layer has a specified degree of hardness and mechanical strength. A percentage of the binder is generally less than 50 wt %, preferably, 0.1 wt % to 20 wt %.

Figure 18:
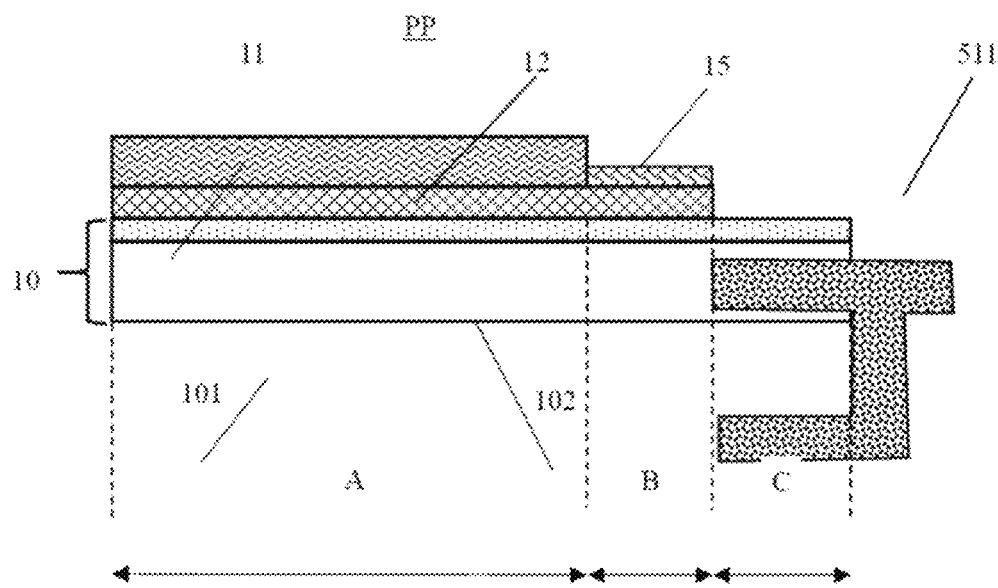
FIG. 18 is a schematic structural cross-sectional view of a positive electrode plate according to an embodiment of this application.

FIG. 18 is an example schematic structural cross-sectional view of a positive electrode plate provided with a support protection layer on a surface of a conductive primer coating layer in an extension zone according to an embodiment of this application. As shown in the figure, the positive electrode plate PP includes a composite current collector 10 and an electrical connection member 511 electrically connected to the current collector 10 through welding. The positive electrode current collector 10 includes a support layer 101 of the positive electrode current collector, a conductive layer 102 of the positive electrode current collector that is provided on one surface of the support layer 101 of the positive electrode current collector, and a positive electrode protection layer 103/positive electrode protection layers 103 (not shown in the figure) that is/are provided on one or two sides of the positive electrode conductive layer 102. The positive electrode current collector 10 may be separated into three zones based on different material layers provided on its surface: a film zone A, an extension zone B, and an transfer welding zone C. The film zone A occupies most of the surface of the positive electrode current collector 10 and has a conductive primer coating layer 12 and a positive electrode active material layer 11 formed thereon in sequence. The transfer welding zone C provides an electrical connection interface between the positive electrode current collector 10 and the electrical connection member 511. A conductive primer coating layer 12 and a support protection layer 15 are provided on the surface of the extension zone B.

FIG. 18 illustrates the support protection layer by using a single-sided composite current collector as an example, but those skilled in the art should understand that the support protection layer can also be provided on both sides of a double-sided composite current collector. In addition, those skilled in the art can understand that the negative electrode plate may also be similarly designed.

Electrode Plate

The electrode plate in this application may be prepared by using various methods commonly used in the art. For example, the composite current collector may be prepared first, and then the conductive primer coating layer slurry may be prepared. The conductive primer coating layer slurry may be applied to one or two surfaces of the composite current collector and dried. Then, the electrode active material layer slurry may be applied and dried. Finally, processing such as post-processing, electrical connection member welding, and internal-short-circuit protection layer formation is performed to obtain a required electrode plate. In some embodiments, the electrical connection member may alternatively be formed on the composite current collector before the conductive primer coating layer and the electrode active material layer are formed.

The electrode active material slurry may be applied in a conventional uniform coating manner, or a special partition coating manner based on characteristics of the composite current collector. In a preferred embodiment of this application, based on compacted density, the electrode active material layer of the electrode plate includes 2n+1 (n=1, 2, or 3) zones distributed in a width direction of the electrode plate (that is, a direction perpendicular to a coating direction), and compacted density of a middle zone is greater than compacted density of zones on two sides. Such special partition design can effectively suppress curvature and edge warping of the composite current collector and the electrode plate caused by roll-in and the like. This ensures that the electrode plate maintains better flatness after roll-in, eliminates or reduces technical problems such as relatively great internal resistance and relatively great polarization of the electrode plate, and helps protect the conductive layer from damage, thereby ensuring a good current flow capacity of the electrode plate and good electrochemical performance of the electrochemical apparatus.

Figure 19:
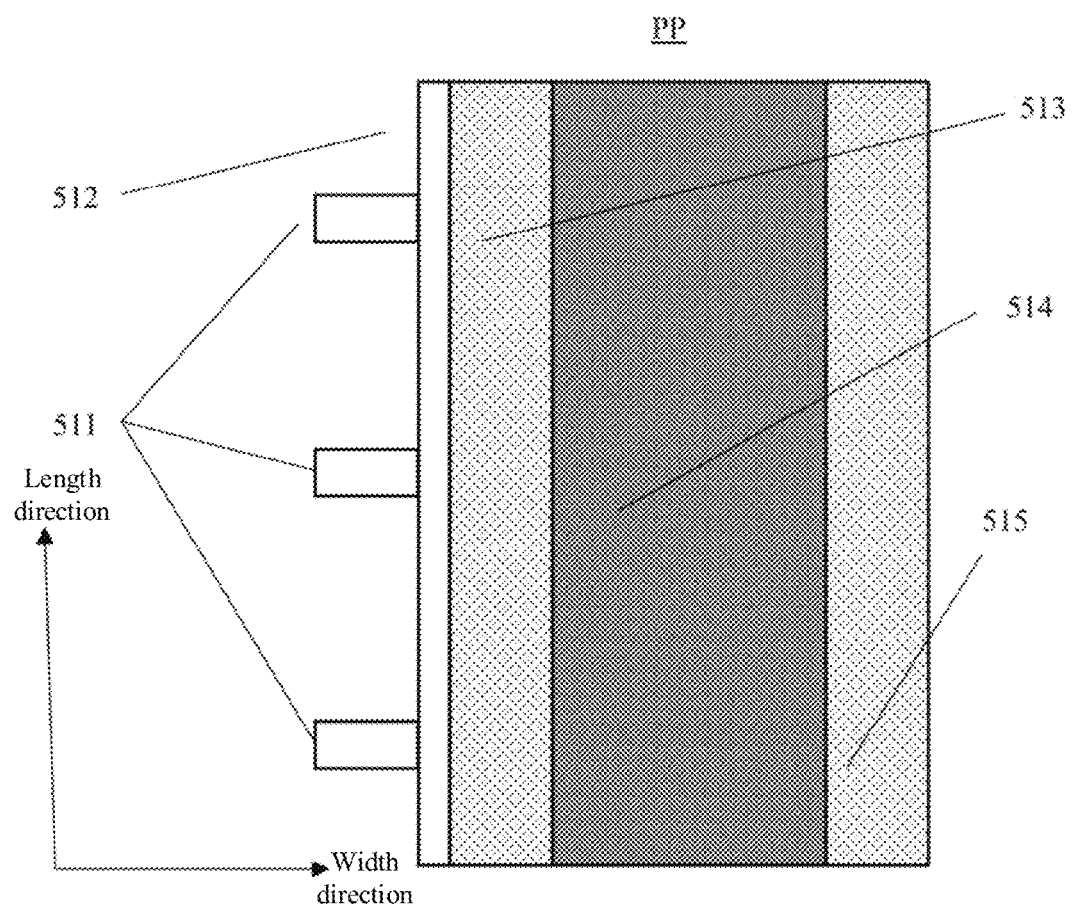
FIG. 19 is a schematic structural vertical view of a positive electrode plate according to an embodiment of this application.

FIG. 19 is a schematic structural vertical view of an electrode plate according to some embodiments of this application. As shown in the figure, the positive electrode plate PP includes a body of the electrode plate and one or more tabs 511 electrically connected to the body of the electrode plate. Based on different electrode active material layers for coating, the body of the electrode plate includes four zones: an extension zone 512 directly connected to the tab 511, a first zone 513 with low compacted density, a zone 514 with high compacted density, and a second zone 515 with low compacted density. That is, viewed in the width direction of the coated surface of the positive electrode plate PP, the electrode active material layer includes 3 zones (that is, 2n+1 zones, where n=1) based on the compacted density. In addition, compacted density of a middle zone 514 is higher than compacted density of zones 513 and 515 on the two sides.

In this application, a ratio of the middle zone with the high compacted density to a total coated zone (that is, a ratio of a width of the zone 514 to a sum of a width of the zone 513, a width of the zone 514, and a width of the zone 515 in this instance) may be, for example, 20% to 80%, preferably, 30% to 70%, preferably, 40% to 60%, or more preferably, 45% to 55%. Widths of the two zones with low compacted density may be the same or different, and preferably, are the same.

In this application, the compacted density of the zone with the low compacted density may be approximately 5% to 30%, such as 7% to 25%, 8% to 20%, or 8% to 18%, lower than the compacted density of the zone with the high compacted density.

In FIG. 19, the positive electrode plate is used as an example to illustrate that according to the preferred partition coating method in this application, similar partition coating can also be performed on the negative electrode plate to improve current flow capacity of the electrode plate and maintain better flatness of the electrode plate, eliminate or reduce technical problems such as large internal resistance and great polarization of the electrode plate, and help prevent the conductive layer from damage, so that the electrode plate and the electrochemical apparatus have good electrochemical performance.

Electrochemical Apparatus

The second aspect of this application provides an electrochemical apparatus, including a positive electrode plate, a negative electrode plate, a separator, and an electrolyte solution, where the positive electrode plate and/or the negative electrode plate are/is the electrode plate according to the first aspect of this application.

The electrochemical apparatus may be a capacitor, a primary battery, or a secondary battery. For example, the electrochemical apparatus may be a lithium-ion capacitor, a lithium-ion primary battery, or a lithium-ion secondary battery.

Figure 20:
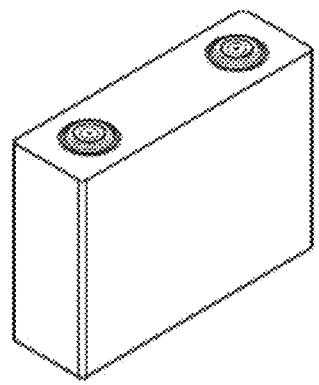
FIG. 20 is a three-dimensional diagram of an electrochemical apparatus serving as a lithium-ion secondary battery according to an embodiment of this application.
Figure 21:
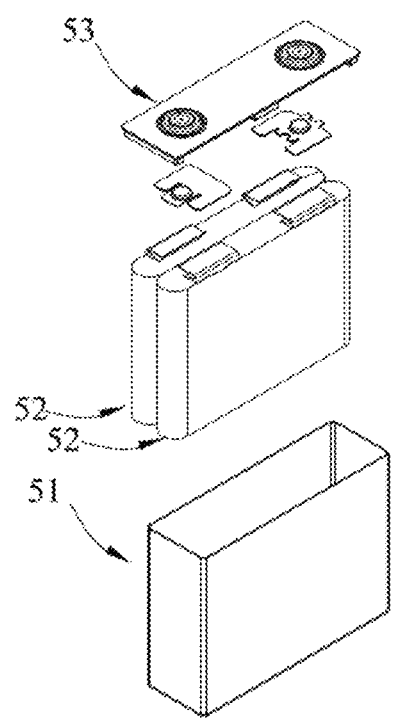
FIG. 21 is an exploded view of the lithium-ion secondary battery in FIG. 20.

FIG. 20 is a three-dimensional diagram of an electrochemical apparatus serving as a lithium-ion secondary battery according to an embodiment of the present invention. FIG. 21 is an exploded view of the lithium-ion secondary battery in FIG. 20. Referring to FIG. 20 and FIG. 21, the lithium-ion secondary battery 5 (hereinafter referred to as the battery cell 5) according to this application includes an outer package 51, an electrode assembly 52, a top cover assembly 53, and an electrolytic solution (not shown). The electrode assembly 52 is accommodated in the outer package 51. A quantity of the electrode assemblies 52 is not limited, and may be one or more.

It should be noted that the battery cell 5 in FIG. 20 is a tank type battery, but is not limited thereto in this application. The battery cell 5 may be a bag type battery, which means that the housing 51 is replaced with a metal plastic film and the top cover assembly 53 is canceled.

A method for constructing and preparing the electrochemical apparatus is well known, except the positive electrode plate and/or the negative electrode plate used in this application. Because the electrode plate in this application is used, the electrochemical apparatus can have improved safety (for example, nail penetration safety) and electrical performance. In addition, because the electrode plate in this application can be easily processed, manufacturing costs of the electrochemical apparatus using the electrode plate in this application can be reduced.

In the electrochemical apparatus in this application, specific types and composition of the separator and the electrolyte solution are not specifically limited, and may be selected based on an actual requirement. Specifically, the separator may be selected from a polyethylene film, a polypropylene film, a polyvinylidene fluoride film, nonwoven fabrics, and a multilayer composite film thereof. When the battery is a lithium-ion battery, a non-aqueous electrolyte solution is generally used as its electrolyte. As the non-aqueous electrolyte solution, a lithium salt solution dissolved in an organic solvent is generally used. The lithium salt is, for example, an inorganic lithium salt such as $LiClO_4$, $LiPF_6$, $LiBF_4$, $LiAsF_6$, or $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ (n≥2). The organic solvents used in the non-aqueous electrolyte solution are, for example, cyclic carbonate such as vinyl carbonate, propylene carbonate, butene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, cyclic ether such as tetrahydrofuran and 2-methyltetrahydrofuran, nitrile such as acetonitrile and propionitrile, or a mixture of these solvents.

Figure 22:
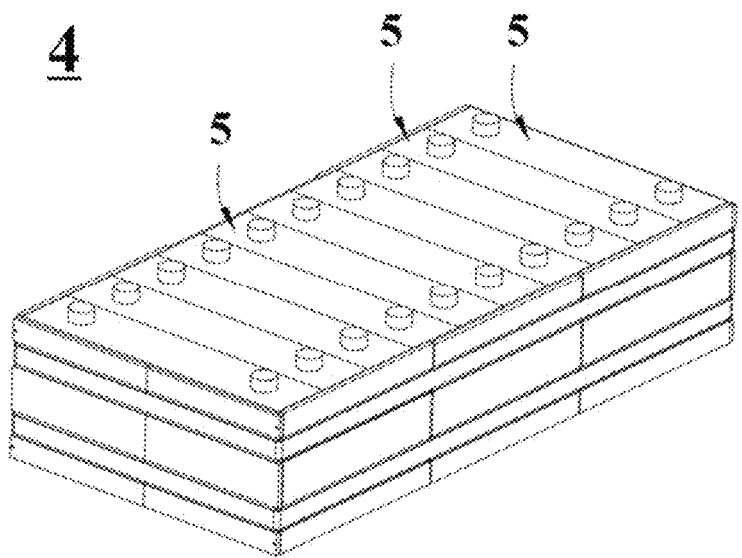
FIG. 22 is a three-dimensional diagram of a battery module according to an embodiment of this application.

In some embodiments, the lithium-ion secondary battery may be assembled into a battery module, and the battery module may include a plurality of lithium-ion secondary batteries. The specific quantity may be adjusted according to the use case and capacity of the battery module. FIG. 22 shows a battery module 4 used as an example. Referring to FIG. 22, in the battery module 4, a plurality of lithium-ion secondary batteries 5 may be sequentially arranged in a length direction of the battery module 4. Certainly, the lithium-ion secondary batteries may alternatively be arranged in any other manner. Further, the plurality of lithium-ion secondary batteries 5 may be fixed by using fasteners. Optionally, the battery module 4 may further include a housing with an accommodating space, and the plurality of lithium-ion secondary batteries 5 are accommodated in the accommodating space.

Figure 23:
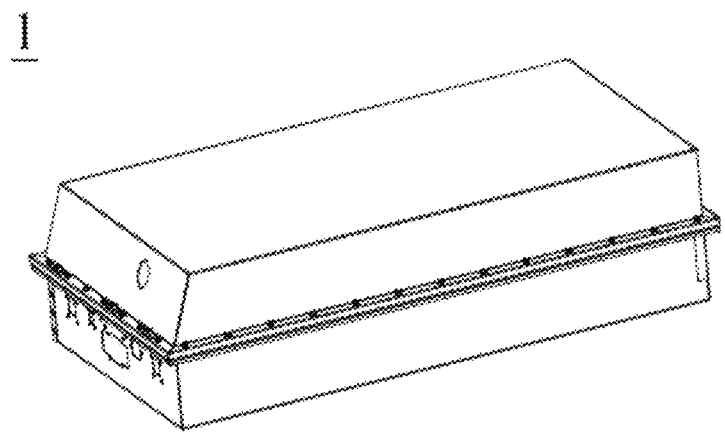
FIG. 23 is a three-dimensional diagram of a battery pack according to an embodiment of this application.
Figure 24:
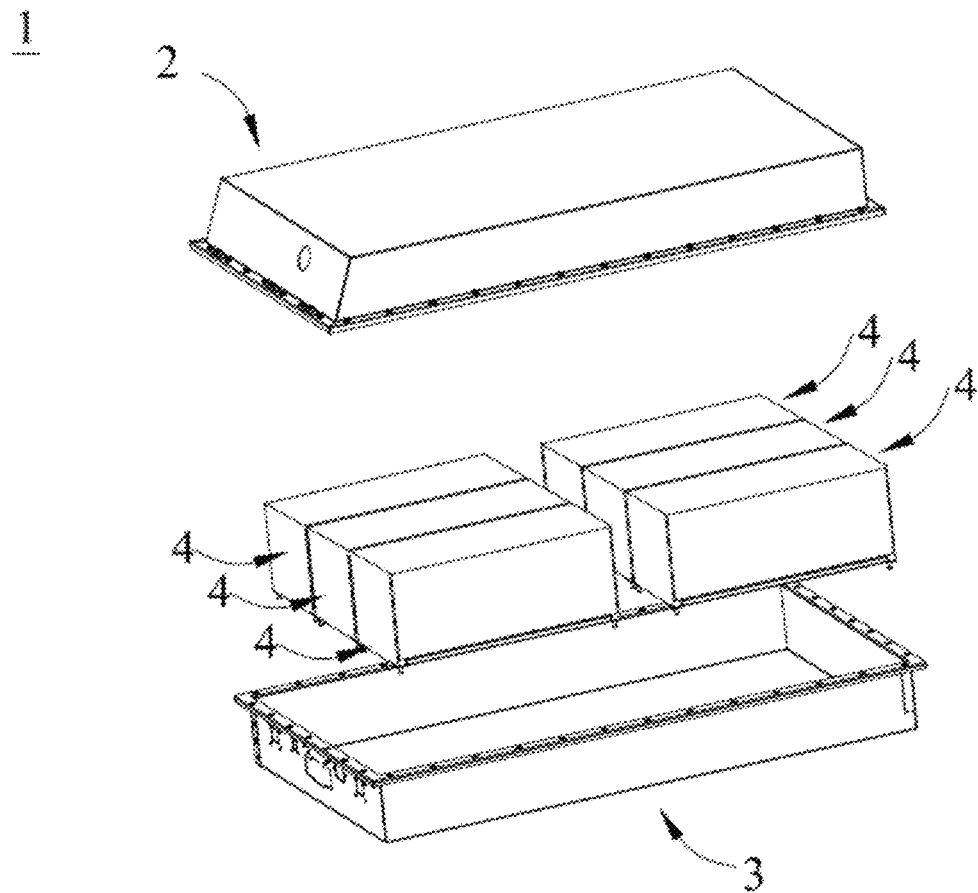
FIG. 24 is an exploded view of the battery pack in FIG. 23.

In some embodiments, the battery module may be further assembled into a battery pack, and a quantity of battery modules included in the battery pack may be adjusted based on application and capacity of the battery pack. FIG. 23 and FIG. 24 show a battery pack 1 used as an example. Referring to FIG. 23 and FIG. 24, the battery pack 1 may include a battery box and a plurality of battery modules 4 provided in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

The third aspect of this application provides an apparatus, including the electrochemical apparatus according to the second aspect of this application. The electrochemical apparatus may serve as a power supply of the apparatus, or may serve as an energy storage unit of the apparatus. The apparatus includes, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A lithium-ion secondary battery, a battery module, or a battery pack may be selected for the apparatus according to requirements for using the apparatus.

Figure 25:
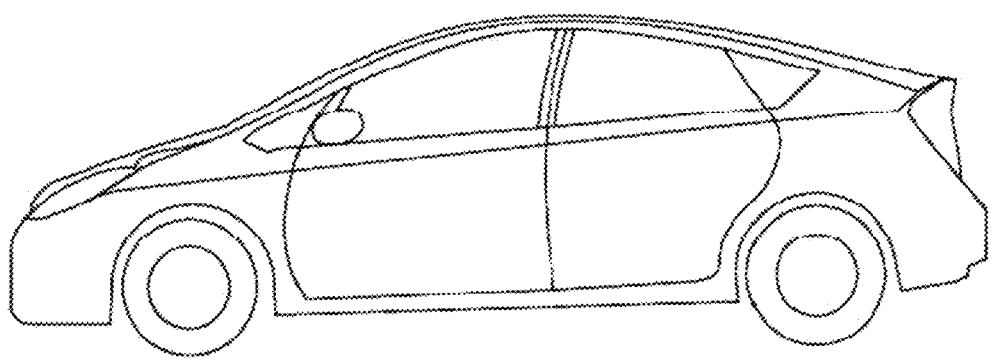
FIG. 25 is a schematic diagram of an apparatus according to an embodiment of this application.

FIG. 25 is a schematic diagram of an apparatus according to an embodiment of this application. The apparatus may be a battery electric vehicle, a hybrid electric vehicle, a plug-in hybrid electric vehicle, or the like. To meet a requirement of the apparatus for high power and high energy density of the lithium-ion secondary battery (that is, the electrochemical apparatus in this application), a battery pack or a battery module may be used.

In another example, the apparatus may be a mobile phone, a tablet computer, a notebook computer, or the like. The apparatus usually requires lightness and thinness, and the lithium-ion secondary battery (that is, the electrochemical apparatus in this application) may be used as a power source.

A person skilled in the art may understand that the foregoing definitions or preferred ranges of component selection, component content, and material physicochemical performance parameters in electrode plates, electrode active material layers, and the like in different embodiments of this application may be randomly combined, and various embodiments obtained through the combination shall still fall within the scope of this application and shall be considered as a part of content disclosed in this specification.

Unless otherwise specified, various parameters in this specification have general meanings well known in the art, and may be measured by using a method well known in the art. For example, a test may be conducted in a method provided in an example of this application. In addition, preferred ranges and options of different parameters provided in various preferred embodiments may be randomly combined, and it is considered that various combinations obtained shall fall within the disclosed scope of this application.

The following further describes beneficial effects of this application with reference to examples.

EXAMPLES

Current collectors used in the electrode plates in examples and comparative examples were prepared as follows:

1. Preparation of a Current Collector without a Protection Layer

A support layer with a specified thickness was selected, and following the conditions below, a conductive layer with a specified thickness was formed on a surface with the support layer through vacuum evaporating, mechanical roll-in, or bonding.

(1) The forming conditions of the vacuum evaporation method are as follows: The support layer subjected to a surface cleaning treatment was placed into a vacuum evaporation chamber, and high-purity metal wires in the metal evaporation chamber were melted and evaporated at a high temperature of 1600° C. to 2000° C. The evaporated metal went through the cooling system in the vacuum evaporation chamber, and finally was deposited on the surface of the support layer to form a conductive layer.

(2) The forming conditions of the mechanical roll-in method are as follows: The foil of the conductive layer material was placed in a mechanical roller, and compacted to a predetermined thickness through rolling by applying pressure of 20 t to 40 t, and then placed onto the surface of the support layer after surface cleaning treatment. Finally, the two were placed in the mechanical roller to be tightly bonded by applying pressure of 30 t to 50 t.

(3) The forming conditions of the bonding method are as follows: The foil of the conductive layer material was placed in a mechanical roller, and rolling compacted to a predetermined thickness by applying a pressure of 20 t to 40 t, and then the surface of the support layer subjected to a surface cleaning treatment was coated with a mixed solution of PVDF and NMP. Finally, the conductive layer of the predetermined thickness was adhered to the surface of the support layer, and dried at 100° C.

2. Preparation of a Current Collector with a Protection Layer

The current collector with the protection layer may be prepared in the following manners:

(1) First, a protection layer was provided on a surface of a support layer by using a vapor deposition method or a coating method, and then a conductive layer of a specified thickness was formed on the surface of the support layer with the protection layer through vacuum evaporating, mechanical roll-in, or bonding to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(2) First, a protection layer was formed on one surface of the conductive layer by using a vapor deposition method, an in-situ formation method, or a coating method, and then the above conductive layer with the protection layer was provided on the surface of the support layer through mechanical roll-in or bonding. The protection layer was provided between the support layer and the conductive layer to prepare a current collector with a protection layer (the protection layer was located between the support layer and the conductive layer). In addition, on the basis of the above, another protection layer was formed on the surface of the conductive layer farther away from the support layer by using a vapor deposition method, an in-situ formation method, or a coating method to prepare a current collector with protection layers (the protection layers were located on two opposite surfaces of the conductive layer).

(3) First, a protection layer was formed on one surface of the conductive layer by using a vapor deposition method, an in-situ formation method, or a coating method, and then the above conductive layer with the protection layer was provided on the surface of the support layer through mechanical roll-in or bonding. The conductive layer with the protection layer was provided on the surface of the support layer farther away from the conductive layer, to prepare a current collector with a protection layer (the protection layer was located on the surface of the support layer farther away from the conductive layer).

(4) First, protection layers were formed on two surfaces of the conductive layer by using a vapor deposition method, an in-situ formation method, or a coating method, and then the above conductive layer with the protection layers was provided on the surface of the support layer through mechanical roll-in or bonding to prepare a current collector with protection layers (the protection layers were located on two opposite surfaces of the conductive layer).

(5) On the basis of the above "preparation of a current collector without a protection layer", another protection layer was formed on the surface of the conductive layer farther away from the support layer by using a vapor deposition method, an in-situ formation method, or a coating method to prepare a current collector with a protection layer (the protection layer was located on the surface of the support layer farther away from the conductive layer).

In the preparation instance, for the vapor deposition method, a vacuum evaporating method was used; for the in-situ formation method, an in-situ passivation method was used; and for the coating method, a doctor blade coating method was used.

The forming conditions of the vacuum evaporation method are as follows: A sample on which surface cleaning processing had performed was placed in a vacuum plating chamber. A protection layer material in an evaporating chamber was melted and evaporated at high temperature of 1600° C. to 2000° C. The evaporated protection layer material went through the cooling system in the vacuum evaporation chamber, and finally was deposited on the surface of the sample to form a protection layer.

The forming conditions of the in-situ passivation method are as follows: A conductive layer was placed in a high-temperature oxidizing environment, where a temperature was controlled to be 160° C. to 250° C., oxygen supplying in the high-temperature environment was maintained, and processing time was 30 min, so that a metal oxide protection layer was formed.

The forming conditions of the gravure coating method are as follows: A protection layer material and NMP were stirred and mixed; and then a sample surface was coated with a slurry of the protection layer material (solid content was 20% to 75%). A coating thickness was then controlled by using a gravure roller. Finally, the coating was dried at a temperature of 100° C. to 130° C.

3. Preparation of an Electrode Plate (1) Preparation of a Positive Electrode Plate without a Conductive Primer Coating Layer A 92 wt % positive electrode active material (if no specific material was specified, NCM 333 was used by default), a 5 wt % conductive agent Super-P ("SP" for short), and a 3 wt % PVDF were mixed with a solvent NMP, and stirred well to prepare a positive electrode active material layer slurry (composition of the active material layer slurry in some examples might vary, and in this case, specified composition in the examples should prevail). Extrusion coating was performed to apply, through partition coating, the positive electrode active material layer slurry on two surfaces of the composite current collector prepared by using the foregoing method, and drying was performed at 85° C. to obtain a positive electrode active material layer.

Then cold-pressing and cutting were performed, and drying was performed for four hours in an 85° C. vacuum condition, and a tab was welded, thereby obtaining a positive electrode plate.

(2) Preparation of a Conventional Positive Electrode Plate

The current collector was Al foil of a thickness of 12 μm. Similar to the preparation method of the foregoing positive electrode plate, the positive electrode active material layer slurry was directly applied on the surface of the current collector of the Al foil, and then the conventional positive electrode plate was obtained through post-processing.

(3) Preparation of a Positive Electrode Plate with a Conductive Primer Coating Layer in a Film Zone A conductive material (such as conductive carbon black), a binder (such as PVDF or polyacrylic acid), and an optional active material were dissolved in an appropriate solvent (such as NMP or water) at a specified ratio, and stirred well to form a primer slurry.

The primer slurry was evenly applied on two surfaces (a blank space was left at an edge to serve as the extension zone and weld a tab) of the composite current collector at a coating speed of 20 m/min, and a primer coating layer was dried, where oven temperature was 70° C. to 100° C., and drying time was 5 min.

After the primer coating layer was fully dried, a 92 wt % positive electrode active material, a 5 wt % conductive agent Super-P ("SP" for short), and a 3 wt % PVDF were mixed with a solvent NMP, and stirred well to prepare a positive electrode active material layer slurry. Extrusion coating was performed to apply the positive electrode active material layer slurry on the surface of the primer coating layer through partition coating, and drying was performed at 85° C. to obtain the positive electrode active material layer. Then a positive electrode plate with a conductive primer coating layer was obtained after post-processing.

(4) Preparation of a Positive Electrode Plate with a Conductive Primer Coating Layer Separately Provided on Surfaces of a Film Zone and an Extension Zone A preparation method is similar to that of the positive electrode plate with the conductive primer coating layer in the film zone in (3) except that before a primer slurry was applied, a conductive member (aluminum strip) was welded at the edge of the extension zone. Then, the primer slurry was applied. When the primer slurry was applied, the primer slurry was applied on the entire surface of the current collector (including the surface of the current collector in the film zone and the surface of the current collector in the extension zone). After the primer coating layer was completely dried, a 92 wt % positive electrode active material, a 5 wt % conductive agent Super-P ("SP" for short), and a 3 wt % PVDF were added to the solvent NMP. The mixed solution was uniformly stirred to prepare a positive electrode active material layer slurry. Extrusion coating was performed to apply, through partition coating, the positive electrode active material layer slurry on the main part of the surface of the primer coating layer (that is, the film zone), leaving a strip-shaped blank on the surface of the primer coating layer near the edge. Then, drying was performed at 85° C. to obtain a positive electrode active material layer. Then, if necessary, a support protection layer was formed on the surface of the primer coating layer in the extension zone. Post-processing was further performed to obtain a positive electrode plate with a conductive primer coating layer separately provided on surfaces of the film zone and the extension zone.

(5) Preparation of a Negative Electrode Plate without a Conductive Primer Coating Layer Negative electrode active substance artificial graphite, conductive agent Super-P, a thickener CMC, and a binder SBR were added to a deionized water solvent at a mass ratio of 96.5:1.0:1.0:1.5, and mixed well to prepare a negative electrode active material layer slurry. Extrusion coating was performed to apply, through partition coating, the negative electrode active material layer slurry on two surfaces of the composite current collector prepared by using the foregoing method, and drying was performed at 85° C. to obtain a negative electrode active material layer.

Then cold-pressing and cutting were performed, and drying was performed for four hours in a 110° C. vacuum condition, and a tab was welded, thereby obtaining a negative electrode plate.

(6) Preparation of a Conventional Negative Electrode Plate

The current collector was Cu foil of a thickness of 8 μm. Similar to that in the preparation method of the above negative electrode plate, the negative electrode active material layer slurry was directly applied on the surface of the current collector of the Cu foil, and then the conventional negative electrode plate was obtained through post-processing.

(7) Preparation of a Negative Electrode Plate with a Conductive Primer Coating Layer in a Film Zone A conductive material (such as conductive carbon black), a binder (such as PVDF or polyacrylic acid), and an optional active material were dissolved in an appropriate solvent (such as NMP or water) at a specified ratio, and stirred well to form a primer slurry.

The primer slurry was evenly applied on two surfaces (a blank zone was left at an edge to serve as the extension zone and weld a tab) of the composite current collector at a coating speed of 20 m/min, and a primer coating layer was dried, where oven temperature was 70° C. to 100° C., and drying time was 5 min.

After the primer coating layer was completely dried, a negative electrode active substance artificial graphite, a conductive agent Super-P, a thickener CMC, and a binder SBR were added to a deionized water solvent at a mass ratio of 96.5:1.0:1.0:1.5, and mixed well to prepare a negative electrode active material layer slurry. Extrusion coating was performed to apply, through partition coating, the negative electrode active material layer slurry on the surface of the primer coating layer, and drying was performed at 85° C. to obtain the negative electrode active material layer. Then a negative electrode plate with a conductive primer coating layer was obtained after post-processing.

(8) Preparation of a Negative Electrode Plate with a Conductive Primer Coating Layer Separately Provided on Surfaces of a Film Zone and an Extension Zone A preparation method is similar to that of the negative electrode plate with the conductive primer coating layer in the film zone in (7), except that before a primer slurry was applied, a conductive member (nickel strip) was welded at the edge of the extension zone. Then, the primer slurry was applied. When the primer slurry was applied, the primer slurry was applied on the entire surface of the current collector (including the surface of the current collector in the film zone and the surface of the current collector in the extension zone). After the primer coating layer was fully dried, negative electrode active substance artificial graphite, a conductive agent Super-P, a thickener CMC, and a binder SBR were added to the solvent deionized water at a mass ratio of 96.5:1.0:1.0:1.5, and well mixed to prepare a negative electrode active material layer slurry. Extrusion coating was performed to apply, through partition coating, the negative electrode active material layer slurry on the main part of the surface of the primer coating layer (that is, the film zone), leaving a strip-shaped blank on the surface of the primer coating layer near the edge. Then, drying was performed at 85° C. to obtain a negative electrode active material layer. Then, if necessary, a support protection layer was formed on the surface of the primer coating layer in the extension zone. Post-processing was further performed to obtain a negative electrode plate with a conductive primer coating layer separately provided on surfaces of the film zone and the extension zone.

4. Preparation of a Battery

Through a common battery manufacturing process, a positive electrode plate (compacted density: 3.4 g/cm$^3$), a PP/PE/PP separator, and a negative electrode plate (compacted density: 1.6 g/cm$^3$) were winded together to form a bare battery cell, then the bare battery cell was placed into a battery housing, the electrolyte (an EC:EMC volume ratio was 3:7, and LiPF$_6$ concentration was 1 mol/L) was injected, and then sealing, formation and other processes were performed to finally obtain a lithium-ion secondary battery (hereinafter referred to as the battery).

5. Battery Testing Method (1) Lithium-Ion Battery Cycle Life Testing Methods

Method 1: The lithium-ion battery was charged and discharged at 45° C. That is, the lithium-ion battery was charged to 4.2 V at a current of 1 C, and then discharged to 2.8 V at a current of 1 C, and the discharge capacity during a first cycle was recorded. 1000 cycles of 1 C/1 C charge and discharge were then performed on the battery, and the battery discharge capacity during a 1000$^{th}$ cycle was recorded. The discharge capacity during the 1000$^{th}$ cycle was divided by the discharge capacity in the first cycle to obtain the capacity retention rate in the 1000$^{th}$ cycle.

Method 2: The lithium-ion battery was charged and discharged at 45° C. That is, the lithium-ion battery was charged to 4.2 V at a current of 0.3 C, and then discharged to 2.8 V at a current of 0.3 C, and the discharge capacity during a first cycle was recorded. 1000 cycles of 0.3 C/0.3 C charge and discharge were then performed on the battery, and the battery discharge capacity during a 1000$^{th}$ cycle was recorded. The discharge capacity during the 1000$^{th}$ cycle was divided by the discharge capacity in the first cycle to obtain the capacity retention rate in the 1000$^{th}$ cycle.

(2) DCR Growth Rate Testing Method

At 25° C., the secondary battery was adjusted to 50% SOC at a current of 1 C, and a voltage U1 was recorded. Then the battery was discharged at a current of 4 C for 30 seconds, and a voltage U2 was recorded. DCR=(U1−U2)/4 C. Then, 500 cycles of 1 C/1 C charge and discharge were performed on the battery, and the DCR during a 500$^{th}$ cycle was recorded. The DCR during the 500$^{th}$ cycle was divided by the DCR in the first cycle and subtracted by 1 to obtain a DCR growth rate during the 500$^{th}$ cycle.

(3) Needle Penetration Test

The secondary batteries (10 samples) were fully charged to the cut-off voltage at a current of 1 C, and then charged at a constant voltage until the current drops to 0.05 C, and then charging stops. A φ 8 mm high temperature resistant steel needle was used to penetrate at a speed of 25 mm/s from a direction perpendicular to a battery electrode plate, and the penetration position needed to be close to the geometric center of the punctured surface. Whether the battery had a phenomenon of burning and explosion while the steel needle stayed in the battery was observed.

6. Test Results and Discussion 6.1 Effect of a Composite Current Collector on Improvement of Weight Energy Density of a Battery Specific parameters of the current collector and the electrode plate in the examples are shown in Table 1 (no current collector in the examples listed in Table 1 is provided with a protection layer). In Table 1, for the positive electrode current collector, the percentage of the current collector by weight refers to the weight of the positive electrode current collector per unit area divided by the weight of the conventional positive electrode current collector per unit area. For the negative electrode current collector, the percentage of the current collector by weight refers to the weight of the negative electrode current collector per unit area divided by the weight of the conventional negative electrode current collector per unit area. Unless otherwise specified, a Young's modulus of the PI used in each current collector was 1.9 GPa, and a Young's modulus of the PET used was 4.2 GPa.

TABLE 1

| Electrode plate number | Current collector number | Support layer Material | D1 | Conductive layer Material | D2 | Current collector thickness | Percentage of a current collector by weight |
|---|---|---|---|---|---|---|---|
| Positive electrode plate 1 | Positive electrode current collector 1 | PI | 6 μm | Al | 300 nm | 6.6 μm | 30.0% |
| Positive electrode plate 2 | Positive electrode current collector 2 | PET | 4 μm | Al | 500 nm | 5 μm | 24.3% |
| Positive electrode plate 3 | Positive electrode current collector 3 | PET | 2 μm | Al | 200 nm | 2.4 μm | 11.3% |
| Positive electrode plate 4 | Positive electrode current collector 4 | PET | 10 μm | Al | 1 μm | 12 μm | 56.5% |
| Positive electrode plate 5 | Positive electrode current collector 5 | PET | 10 μm | Al | 1.5 μm | 13 μm | 65% |
| Positive electrode plate 6 | Positive electrode current collector 6 | PET | 10 μm | Al | 2 μm | 14 μm | 73.5% |
| Conventional positive electrode plate | Conventional positive electrode current collector | / | / | Al | / | 12 μm | 100% |
| Negative electrode plate 1 | Negative electrode current collector 1 | PET | 5 μm | Cu | 500 nm | 6 μm | 21.6% |
| Negative electrode plate 2 | Negative electrode current collector 2 | PI | 2 μm | Cu | 800 nm | 3.6 μm | 23.8% |
| Negative electrode plate 3 | Negative electrode current collector 3 | PET | 8 μm | Cu | 1 μm | 10 μm | 39.6% |
| Negative electrode plate 4 | Negative electrode current collector 4 | PET | 6 μm | Cu | 1.5 μm | 9 μm | 48.5% |
| Negative electrode plate 5 | Negative electrode current collector 5 | PET | 4 μm | Cu | 1.2 μm | 6.4 μm | 37.3% |
| Negative electrode plate 6 | Negative electrode current collector 6 | PET | 10 μm | Cu | 200 nm | 10.4 μm | 23.3% |
| Negative electrode plate 7 | Negative electrode current collector 7 | PI | 8 μm | Cu | 2 μm | 12 μm | 65.3% |
| Conventional negative electrode plate | Conventional negative electrode current collector | / | / | Cu | / | 8 μm | 100% |

It may be learned from Table 1 that, compared with the conventional current collector, weights of both the composite positive electrode current collector and the composite negative electrode current collector according to this application were reduced to some degree, thereby improving the weight energy density of the battery. However, when the thickness of the conductive layer was greater than 1.5 μm, the weight reduction degree of the current collector became smaller, especially for the negative electrode current collector.

6.2 Effect of a Protection Layer on Improvement of Electrochemical Performance of a Composite Current Collector On the basis of the current collector of each example listed in Table 1, a protection layer was further formed to investigate the effect of a protection layer on improvement of the electrochemical performance of the composite current collector. The "positive electrode current collector 2-1" in Table 2 means a current collector obtained by forming a protection layer on the basis of the "positive electrode current collector 2" in Table 1. Numbers of other current collectors have similar meanings.

TABLE 2

| Electrode plate number | Current collector number | Upper protection layer Material | D3' | Lower protection layer Material | D3" |
|---|---|---|---|---|---|
| Positive electrode plate 2-1 | Positive electrode current collector 2-1 | Nickel oxide | 10 nm | Nickel oxide | 8 nm |
| Positive electrode plate 2-2 | Positive electrode current collector 2-2 | Nickel oxide | 50 nm | Nickel oxide | 30 nm |
| Positive electrode plate 4-1 | Positive electrode current collector 4-1 | Aluminum oxide | 30 nm | Aluminum oxide | 30 nm |
| Negative electrode plate 4-1 | Negative electrode current collector 4-1 | / | / | Nickel | 200 nm |
| Negative electrode plate 4-2 | Negative electrode current collector 4-2 | Nickel | 5 nm | / | / |
| Negative electrode plate 4-3 | Negative electrode current collector 4-3 | Nickel-based alloy | 100 nm | / | / |
| Negative electrode plate 4-4 | Negative electrode current collector 4-4 | Nickel | 10 nm | Nickel | 10 nm |
| Negative electrode plate 4-5 | Negative electrode current collector 4-5 | Nickel | 50 nm | Nickel | 50 nm |
| Negative electrode plate 4-6 | Negative electrode current collector 4-6 | Nickel | 100 nm | Nickel | 50 nm |
| Negative electrode plate 4-7 | Negative electrode current collector 4-7 | Double-layered protection layer | 50 nm | Nickel | 30 nm |

Note: (1) Nickel-based alloy: 90 wt % Ni, and 10 wt % chromium.
(2) Double-layered protection layer: a nickel metal protection layer provided on the surface of the conductive layer facing away from the support layer, with a thickness of 20 nm; and a nickel oxide protection layer provided on the surface of the nickel metal protection layer facing away from the support layer, with a thickness of 30 nm.

Table 3 shows cyclic performance data measured after a battery is assembled by using an electrode plate (without a conductive primer coating layer) listed in Table 2.

As shown in Table 3, compared with the battery 1 using the conventional positive electrode plate and the conventional negative electrode plate, the battery using the composite current collector had good cycle life and had cycle performance equivalent to that of the conventional battery. Especially for a battery manufactured by using a current collector with a protection layer, compared with a battery manufactured by using a current collector without a protection layer, a capacity retention rate of the battery could be further improved, which indicates that the battery is more reliable.

TABLE 3

| Battery number | Electrode plate | | Capacity retention rate in the $1000^{th}$ cycle at 45° C. (method 1) |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |
| Battery 4-1 | Conventional negative electrode plate | Positive electrode plate 4-1 | 86.5% |
| Battery 5 | Negative electrode plate 4 | Conventional positive electrode plate | 86.3% |
| Battery 6 | Negative electrode plate 4-1 | Conventional positive electrode plate | 87.1% |
| Battery 7 | Negative electrode plate 4-2 | Conventional positive electrode plate | 86.5% |
| Battery 8 | Negative electrode plate 4-3 | Conventional positive electrode plate | 86.7% |
| Battery 9 | Negative electrode plate 4-4 | Conventional positive electrode plate | 87.6% |
| Battery 10 | Negative electrode plate 4-5 | Conventional positive electrode plate | 87.8% |
| Battery 11 | Negative electrode plate 4-6 | Conventional positive electrode plate | 88.0% |
| Battery 12 | Negative electrode plate 4-7 | Conventional positive electrode plate | 88.4% |

6.3 Effect of a Composite Current Collector on Improvement of Nail Penetration Safety of a Battery The following describes the effect of the composite current collector on the improvement of the nail penetration safety of the battery by using the positive electrode plate as an example.

TABLE 4

| Electrode plate number | Support layer Material | D1 | Conductive layer Material | D2 | Electrode active material layer Material | D4 |
|---|---|---|---|---|---|---|
| Positive electrode plate 11 | PI | 2 μm | Al | 800 nm | NCM 811 | 55 μm |
| Positive electrode plate 12 | PI | 5 μm | Al | 2 μm | NCM 811 | 55 μm |
| Positive electrode plate 13 | PI | 6 μm | Al | 300 nm | NCM 811 | 55 μm |
| Positive electrode plate 14 | PET | 5 μm | Al | 500 nm | NCM 811 | 55 μm |
| Positive electrode plate 15 | PET | 10 μm | Al | 1 μm | NCM 811 | 55 μm |
| Positive electrode plate 16 | PET | 8 μm | Al | 1.5 μm | NCM 811 | 55 μm |

(No conductive primer coating layer was provided on electrode plates in Table 4)

TABLE 5

| Battery number | Positive electrode plate | Negative electrode plate | Nail penetration test result |
|---|---|---|---|
| Battery 20 | Conventional positive electrode plate | Conventional negative electrode plate | All failed |
| Battery 21 | Positive electrode plate 11 | Conventional negative electrode plate | All passed |
| Battery 22 | Positive electrode plate 12 | Conventional negative electrode plate | All passed |
| Battery 23 | Positive electrode plate 13 | Conventional negative electrode plate | All passed |
| Battery 24 | Positive electrode plate 14 | Conventional negative electrode plate | All passed |
| Battery 25 | Positive electrode plate 15 | Conventional negative electrode plate | All passed |
| Battery 26 | Positive electrode plate 16 | Conventional negative electrode plate | All passed |

Because a lithium-ion battery using the composite current collector had a thinner conductive layer than the conventional metal current collector, metal burr generated in an abnormal case such as nail penetration was relatively small, and a support layer of the composite current collector had relatively great short-circuit resistance, thereby improving nail penetration safety performance of the battery. It may be learned from the foregoing table that, the conventional battery had thermal runaway and destruction in the nail penetration case and could not pass the nail penetration safety test. All lithium-ion batteries using the composite current collector could pass the nail penetration safety test.

6.4 Effect of a Conductive Primer Coating Layer on Improvement of Electrochemical Performance of a Battery The following uses the positive electrode plate as an example to illustrate effects of the conductive primer coating layer and composition of the conductive primer coating layer on improvement of the electrochemical performance of the battery. Table 8 shows specific composition and related parameters of batteries and the electrode plates and current collectors used therein in examples and comparative examples (in Table 6, except the comparative positive electrode plate 20, all other positive electrode plates were provided with a conductive primer coating layer). Table 7 shows a performance measurement result of each battery. Unless otherwise specified, the conductive primer coating layer of each electrode plate was provided only in the film zone.

TABLE 6

| Electrode plate number | Current collector number | Support layer Material | D1 | Conductive layer Material | D2 | Conductive primer coating layer | Electrode active material layer |
|---|---|---|---|---|---|---|---|
| Comparative positive electrode plate 20 | Positive electrode current collector 4 | PET | 10 μm | Al | 1 μm | / | NCM 333, D50 9.8 μm, an active material layer of a thickness of 55 μm |
| Positive electrode plate 21 | Positive electrode current collector 4 | PET | 10 μm | Al | 1 μm | 10% conductive carbon black, 90% aqueous polyacrylic acid, with a thickness of 1.5 μm | Same as the above |
| Positive electrode plate 22 | Positive electrode current collector 4 | PET | 10 μm | Al | 1 μm | 20% conductive carbon black, 80% aqueous polyacrylic acid, with a thickness of 1.5 μm | Same as the above |
| Positive electrode plate 23 | Positive electrode current collector 4 | PET | 10 μm | Al | 1 μm | 50% conductive carbon black, 50% aqueous PVDF, with a thickness of 1.5 μm | Same as the above |
| Positive electrode plate 24 | Positive electrode current collector 4 | PET | 10 μm | Al | 1 μm | 65% conductive carbon black, 35% aqueous PVDF, with a thickness of 1.5 μm | Same as the above |
| Positive electrode plate 25 | Positive electrode current collector 4 | PET | 10 μm | Al | 1 μm | 80% conductive carbon black, 20% aqueous PVDF, with a thickness of 1.5 μm | Same as the above |

TABLE 6-continued

| Electrode plate number | Current collector number | Support layer Material | D1 | Conductive layer Material | D2 | Conductive primer coating layer | Electrode active material layer |
|---|---|---|---|---|---|---|---|
| Positive electrode plate 26 | Positive electrode current collector 4 | PET | 10 μm | Al | 1 μm | 99% conductive carbon black, 1% aqueous PVDF, with a thickness of 1.5 μm | Same as the above |
| Positive electrode plate 27 | Positive electrode current collector 4 | PET | 10 μm | Al | 1 μm | 65% conductive carbon black, 35% oily PVDF, with a thickness of 1.5 μm | Same as the above |
| Positive electrode plate 28 | Positive electrode current collector 4 | PET | 10 μm | Al | 1 μm | 80% conductive carbon black, 20% oily PVDF, with a thickness of 1.5 μm | Same as the above |
| Positive electrode plate 29 | Positive electrode current collector 4 | PET | 10 μm | Al | 1 μm | 32.5% conductive carbon black, 32.5% flake conductive graphite (D50 0.05 μm), 35% aqueous PVDF, with a thickness of 1.5 μm | Same as the above |
| Positive electrode plate 30 | Positive electrode current collector 4 | PET | 10 μm | Al | 1 μm | 65% conductive carbon black, 35% aqueous PVDF, with a thickness of 500 nm | Same as the above |
| Positive electrode plate 31 | Positive electrode current collector 4 | PET | 10 μm | Al | 1 μm | 65% conductive carbon black, 35% aqueous PVDF, with a thickness of 2 μm | Same as the above |
| Positive electrode plate 32 | Positive electrode current collector 4 | PET | 10 μm | Al | 1 μm | 65% conductive carbon black, 35% aqueous PVDF, with a thickness of 5 μm | Same as the above |

TABLE 7

| Battery number | Electrode plate | | DCR growth rate |
|---|---|---|---|
| Battery 30 | Comparative positive electrode plate 20 | Conventional negative electrode plate | 35% |
| Battery 31 | Positive electrode plate 21 | Conventional negative electrode plate | 30.9% |
| Battery 32 | Positive electrode plate 22 | Conventional negative electrode plate | 29% |
| Battery 33 | Positive electrode plate 23 | Conventional negative electrode plate | 20% |
| Battery 34 | Positive electrode plate 24 | Conventional negative electrode plate | 15% |
| Battery 35 | Positive electrode plate 25 | Conventional negative electrode plate | 14.5% |
| Battery 36 | Positive electrode plate 26 | Conventional negative electrode plate | 14% |
| Battery 37 | Positive electrode plate 27 | Conventional negative electrode plate | 18.5% |
| Battery 38 | Positive electrode plate 28 | Conventional negative electrode plate | 18.2% |
| Battery 39 | Positive electrode plate 29 | Conventional negative electrode plate | 12.9% |
| Battery 40 | Positive electrode plate 30 | Conventional negative electrode plate | 15.5% |
| Battery 41 | Positive electrode plate 31 | Conventional negative electrode plate | 14.6% |
| Battery 42 | Positive electrode plate 32 | Conventional negative electrode plate | 14.1% |

It can be learned from the above test data that:

(1) When a composite current collector with a thin conductive layer (that is, the comparative positive electrode plate 20 without a conductive primer coating layer) was used, the battery had large DCR and a low cycle capacity retention rate due to shortcomings such as poorer conductivity than a conventional metal current collector, and damage vulnerability of the conductive layer in the composite current collector. However, after the conductive primer coating layer was introduced, by effectively mending the surface of the current collector and constructing a conductive network among the current collector, the conductive primer coating layer, and the active substance, the conductive primer coating layer improved the electron transfer efficiency, and reduced the resistance between the current collector and the electrode active material layer, so that the DCR could be effectively reduced.

(2) With increase of the conductive agent contained in the conductive primer coating layer (the positive electrode plates 21 to 26), the DCR of the battery could be greatly reduced.

(3) Given same composition, introduction of a aqueous binder could improve the DCR more significantly than an oily binder (positive electrode plate 24 vs. positive electrode plate 27, and positive electrode plate 25 vs. positive electrode plate 28).

(4) The flake graphite could generate "horizontal sliding", thereby achieving a function of buffering, reducing the damage to the conductive layer of the current collector during the compaction, and reducing cracks. Therefore, the flake graphite could further reduce the DCR of the battery (a positive electrode plate 24 vs. a positive electrode plate 29).

(5) With the increase of the thickness of the conductive primer coating layer (a positive electrode plate 30 to a positive electrode plate 32), the DCR of the battery could be reduced more significantly. However, a too-large thickness of the conductive primer coating layer was not conducive to the improvement of the energy density of the battery.

6.5 Effect of a Percentage of a Binder Contained in an Electrode Active Material Layer on Improvement of Electrochemical Performance of a Battery When the binder contained in the electrode active material layer was high, the bonding force between the active material layer and the current collector was strong, and when there was the conductive primer coating layer, the bonding force between the entire film layer (that is, a collective term for the active material layer and the conductive primer coating layer) and the composite current collector was also strong. Therefore, in an abnormal case such as nail penetration, the active material layer (or the film layer) could efficiently wrap the metal burrs generated in the conductive layer to improve the nail penetration safety performance of the battery.

The following uses the positive electrode plate as an example to illustrate the effects of the binder contained in the electrode active material layer on improvement of the electrochemical performance of the battery from the perspective of the safety of battery nail penetration. The positive electrode plates were prepared according to the method described in the preceding examples, but the composition of the positive electrode active material layer slurry was adjusted to prepare a plurality of positive electrode plates with different binder contents in the positive electrode active material layer. The specific electrode plate composition is shown in the table below.

tive primer coating layer, but the conclusion drawn also applied to electrode plates provided with a conductive primer coating layer.

(1) Positive Electrode Plate Obtained Through Partition Coating

The used composite current collector had two surfaces of 10 μm PET on which an Al layer of a thickness of 1 μm was vapor-deposited.

A 92 wt % positive electrode active material NCM 333, a 5 wt % conductive agent Super-P ("SP" for short), and a

TABLE 8

| Electrode plate number | Current collector number | Support layer Material | D1 | Conductive layer Material | D2 | Conductive primer coating layer | Electrode active material layer |
|---|---|---|---|---|---|---|---|
| Positive electrode plate 33 | Positive electrode current collector 4 | PET | 10 μm | Al | 1 μm | 65% conductive carbon black, 35% aqueous PVDF, with a thickness of 1.5 μm | NCM 811, D50 6.5 μm, an active material layer of a thickness of 55 μm, 0.5 wt % binder PVDF |
| Positive electrode plate 34 | Positive electrode current collector 4 | PET | 10 μm | Al | 1 μm | 65% conductive carbon black, 35% aqueous PVDF, with a thickness of 1.5 μm | NCM 811, D50 6.5 μm, an active material layer of a thickness of 55 μm, 1 wt % binder PVDF |
| Positive electrode plate 35 | Positive electrode current collector 4 | PET | 10 μm | Al | 1 μm | 65% conductive carbon black, 35% aqueous PVDF, with a thickness of 1.5 μm | NCM 811, D50 6.5 μm, an active material layer of a thickness of 55 μm, 2 wt % binder PVDF |
| Positive electrode plate 36 | Positive electrode current collector 4 | PET | 10 μm | Al | 1 μm | 65% conductive carbon black, 35% aqueous PVDF, with a thickness of 1.5 μm | NCM 811, D50 6.5 μm, an active material layer of a thickness of 55 μm, 3 wt % binder PVDF |

Table 9 shows nail penetration test results of the batteries assembled by using the foregoing different positive electrode plates. The results show that the higher percentage of the binder contained in the positive electrode active material layer generated better nail penetration safety performance of the corresponding battery. The binder contained in the positive electrode active material layer was preferably not less than 1 wt %, more preferably not less than 1.5 wt %, or most preferably, not less than 2 wt %.

TABLE 9

| Battery number | Electrode plate | | Nail penetration test result |
|---|---|---|---|
| Battery 43 | Positive electrode plate 33 | Conventional negative electrode plate | 1 passed, 9 failed |
| Battery 44 | Positive electrode plate 34 | Conventional negative electrode plate | 6 passed, 4 failed |
| Battery 45 | Positive electrode plate 35 | Conventional negative electrode plate | All passed |
| Battery 46 | Positive electrode plate 36 | Conventional negative electrode plate | All passed |

6.6 Effect of coating methods of an electrode active material layer on performance of the electrode plate The following describes impact of different coating methods of the active material layer of the electrode plate on flatness of the electrode plate. Specifically, the following three different types of positive electrode plates and negative electrode plates were respectively compared in terms of flatness. To simplify influencing factors, none of the electrode plates in the comparison was provided with a conduc- 3 wt % PVDF were mixed with a solvent NMP, and stirred well to prepare a positive electrode active material layer slurry.

Partition coating was performed on two surfaces of the composite current collector through extrusion coating. That is, a middle zone was a zone with a high coating weight, and zones on two sides were zones with a low coating weight (which could be implemented by extruding a spacer or a baffle plate), and drying was performed at 85° C. A width of the zone with a high coating weight was 4 cm, and both widths of the zones with a low coating weight were 2.1 cm.

Then cold-pressing and cutting were performed, and drying was performed for four hours in an 85° C. vacuum condition, and a tab was welded, thereby obtaining a positive electrode plate.

Compacted density of the zone with a high coating weight was 3.45 g/cm$^3$, and compacted density of both the zones with a low coating weight was 3.3 g/cm$^3$.

A compacted density testing method: 30 wafers with an area of S were first cut from the current collector, and weights and thicknesses of the 30 wafers were measured. An average weight m1 and an average height H1 were calculated. 30 wafers with an area of S were then cut from the electrode plate, and an average weight m2 and an average height H2 were calculated. In this way:

Compacted density=$(m2-m1)/((H2-H1) \times S)$ (2) Evenly-Coated Comparative Positive Electrode Plate The foregoing composite current collector with Al-coated PET of a thickness of 10 μm was also used as the current collector, and was prepared by using a method similar to the preparation method of the foregoing positive electrode plate. However, the positive electrode active material layer slurry was directly evenly applied on two surfaces of the composite current collector. That is, no partitioning processing was performed. Then, post-processing was performed to obtain an evenly-coated comparative positive electrode plate. Compacted density of the positive electrode active material layer was 3.4 g/cm³.

(3) Conventional Positive Electrode Plate

The current collector was Al foil of a thickness of 12 μm. Similar to that in the preparation method of the above comparative positive electrode plate, the positive electrode active material layer slurry was evenly directly applied on the two surfaces of the current collector of the Al foil, and then the conventional positive electrode plate was obtained through post-processing.

(4) Negative Electrode Plate Obtained Through Partition Coating

The used composite current collector had two surfaces of 10 μm PET on which a Cu layer of a thickness of 1 μm was vapor-deposited.

A negative electrode active substance artificial graphite, a conductive agent Super-P, a thickener CMC, and a binder SBR were added to a deionized water solvent at a mass ratio of 96.5:1.0:1.0:1.5, and mixed well to prepare a negative electrode active material layer slurry.

Partition coating was performed on the two surfaces of the composite current collector through extrusion coating. That is, a middle zone was a zone with a high coating weight, and zones on two sides were zones with a low coating weight (which could be implemented by extruding a spacer or a baffle plate), and drying was performed at 85° C. to obtain the negative electrode active material layer. A width of the zone with a high coating weight was 4.5 cm, and both widths of the zones with a low coating weight were 2 cm.

Then the current collector having various coating layers was cold-pressed and cut, and dried for four hours in a 110° C. vacuum condition, and a tab was welded, thereby obtaining a negative electrode plate.

Compacted density of the zone with a high coating weight was 1.7 g/cm³, and compacted density of both the zones with a low coating weight was 1.6 g/cm³.

(5) Evenly-Coated Comparative Negative Electrode Plate

The foregoing composite current collector with Cu-coated PET of a thickness of 10 μm was also used as the current collector, and was prepared by using a method similar to the preparation method of the foregoing negative electrode plate except that the negative electrode active material layer slurry was directly evenly applied on two surfaces of the composite current collector, that is, no partitioning processing was performed. Then, post-processing was performed to obtain an evenly-coated comparative negative electrode plate. Compacted density of the negative electrode active material layer was 1.65 g/cm³.

(6) Conventional Negative Electrode Plate

The current collector was Cu foil of a thickness of 8 μm. Similar to that in the preparation method of the foregoing comparative negative electrode plate that was evenly coated, the negative electrode active material layer slurry was directly evenly applied on the surface of the current collector of the Cu foil, and then the conventional negative electrode plate was obtained through post-processing.

Flatness of the foregoing six different electrode plates was measured. A flatness test of the electrode plate was conducted by measuring an arc height of the electrode plate relative to a reference plane. The arc height was measured specifically as follows:

An electrode plate sample of a length of 2 m was taken, placed on the reference plane, and expanded in a width direction of the plane, where the width of the plane was slightly less than a length of the electrode plate sample. Heavy objects with a same weight (1 Kg) were then placed on both sides of the sample, so that the sample was attached to the plane. Then a soft ruler was used to measure a height of a middle zone of the sample above the plane, and the height above the plane was the arc height. During actual production, the electrode plate with an arc height less than or equal to 2 mm was usually considered to be flat, and the positive electrode plate and the negative electrode plate can be accurately aligned when assembled into a battery.

The following table shows specific measurement results:

TABLE 10

| Electrode plate | Arc height |
| --- | --- |
| Positive electrode plate coated through partition | Less than 2 mm |
| Evenly-coated comparative positive electrode plate | Greater than 5 mm |
| Conventional positive electrode plate | Less than 2 mm |
| Negative electrode plate coated through partition | Less than 2 mm |
| Evenly-coated comparative negative electrode plate: | Greater than 5 mm |
| Conventional negative electrode plate | Less than 2 mm |

It may be learned from the measurement results in the foregoing table that, the conventional positive electrode plate or negative electrode plate using a metal current collector met a requirement for flatness of the electrode plate (the arc height was less than or equal to 2 mm), which could implement accurate alignment during battery assembly. However, if the composite current collector was evenly-coated according to the conventional process and if no extra processing was performed, the arc height of the electrode plate was relatively great (greater than 5 mm), the flatness of the electrode plate was not desirable, which made it difficult to implement accurate alignment during battery assembly. However, after the partition coating process in this application was used, the arc height was significantly reduced, which was similar to that of the conventional electrode plate, thereby implementing accurate alignment during battery assembly. It can be learned that the special design of the partition coating of the active material layer could eliminate or reduce possible edge warping and curvature of the electrode plate including the composite current collector after roll-in, flatness of the electrode plate was improved, and accurate alignment was implemented during battery assembly. In addition, the battery could also have excellent electrochemical performance and safety performance brought by the composite current collector.

6.7 Impact of Distribution of the Conductive Primer Coating Layer on Performance of the Electrode Plate The following illustrates impact of distribution of the conductive primer coating layer on performance of the electrode plate, especially current flow capacity. For this purpose, a positive electrode plate without a primer coating layer, a positive electrode plate with a primer coating layer only in the film zone, a positive electrode plate with a primer coating layer in both the film zone and the extension zone, and a positive electrode plate with a primer coating layer in the film zone and the extension zone and with a support protection layer in the extension zone were prepared separately. Then fusing times of the tabs were measured to compare current flow capacities of different types of electrode plates. During the preparation of each electrode plate, the electrode active material layer was coated by using a partition coating method to ensure that the conductive layer of the electrode plate was less damaged, while had high production efficiency of the electrode plate; and layout of the extension zone was shown in FIG. 17C.

A specific method for testing the fusing time of the tabs was as follows:

Five U-shaped electrode plates (that is, electrode plates with two protruding tabs) with a length of 140 mm and a width of 80 mm were cut and welded together with adapting sheets, and charged at a current of 50 A to observe the breaking time of the tabs. If no breaking occurred, the current was increased by 10 A from 50 A, and so on. Shorter time indicates a worse current flow capacity.

referred to as an extension zone, where the transition zone is of the current collector between the film zone and the transfer welding zone, and is coated with no electrode active material layer;

the current collector comprises a support layer and a conductive layer provided on at least one surface of the support layer, a single-sided thickness D2 of the conductive layer satisfies: 30 nm≤D2≤3 μm, and the support layer is a polymer material layer or a polymer composite material layer; and

TABLE 11

| Electrode plate number | Current collector number | Conductive primer coating layer | Electrode active material layer | Support protection layer | Tab fusing time |
|---|---|---|---|---|---|
| Comparative positive electrode plate 20 | Positive electrode current collector 4 | / | NCM 333, D50 9.8 μm, an active material layer of a thickness of 55 μm | / | 100 A 10 s |
| Positive electrode plate 25 | Positive electrode current collector 4 | 80% conductive carbon black, 20% aqueous PVDF, with a thickness of 1.5 μm Film zone only | Same as the above | / | 100 A 20 s |
| Positive electrode plate 25-1 | Positive electrode current collector 4 | Same as the above. Extension zone only | Same as the above | / | 100 A 20 s |
| Positive electrode plate 25-2 | Positive electrode current collector 4 | Same as the above. Film zone + extension zone | Same as the above | / | 150 A 30 s |
| Positive electrode plate 25-3 | Positive electrode current collector 4 | Same as the above. Film zone + extension zone | Same as the above | Polyacrylic acid layer, 10 μm thickness | 100 A 20 s |
| Positive electrode plate 25-4 | Positive electrode current collector 4 | Same as the above. Film zone + extension zone | Same as the above | Aluminum oxide layer, 50 wt % aluminum oxide, 20 wt % aqueous polyacrylic acid, with a thickness of 15 μm | 100 A 26 s |
| Positive electrode plate 25-5 | Positive electrode current collector 4 | Same as the above. Film zone + extension zone | Same as the above | Aluminum oxide layer, 80 wt % aluminum oxide, 10 wt % aqueous polyacrylic acid, with a thickness of 30 μm | 100 A 30 s |
| Positive electrode plate 25-6 | Positive electrode current collector 4 | Same as the above. Film zone + extension zone | Same as the above | Aluminum oxide layer, 98 wt % aluminum oxide, 0.5 wt % aqueous polyacrylic acid, with a thickness of 33 μm | 100 A 36 s |
| Positive electrode plate 66 | Positive electrode current collector 4-1 | Same as the above. Film zone + extension zone | Same as the above | Aluminum oxide layer, 98 wt % aluminum oxide, 0.5 wt % aqueous polyacrylic acid, with a thickness of 35 μm | 150 A 20 s |
| Positive electrode plate 67 | Positive electrode current collector 4 | / | Same as the above except that the electrode active material layer was coated using the uniform coating method | / | 100 A 8 s |

The above test data shows that providing the primer coating layer in only the film zone could improve the current flow capacity of the electrode plate. On this basis, providing the primer coating layer and further providing the support protection layer in the extension zone could further improve the current flow capacity of the electrode plate.

Some exemplary embodiments of the present invention are provided as follows.

Embodiment 1. An electrode plate, comprising a current collector, an electrode active material layer provided on at least one surface of the current collector, and an electrical connection member electrically connected to the current collector, wherein the electrode active material layer is provided on a main body portion of the current collector at a zone referred to as a film zone, the electrical connection member and the current collector are welded and connected at an edge of the current collector at a welding zone referred to as an transfer welding zone, and a transition zone is a conductive primer coating layer containing a binder and a conductive material is separately provided between the current collector and the electrode active material layer in the film zone of the current collector and on a surface of the extension zone of the current collector.

Embodiment 2. The electrode plate according to Embodiment 1, wherein based on a total weight of the conductive primer coating layer, a percentage of the conductive material by weight is 10% to 99%, preferably, 20% to 80%, or more preferably, 50% to 80%; and/or based on a total weight of the conductive primer coating layer, a percentage of the binder by weight is 1% to 90%, preferably, 20% to 80%, or more preferably, 20% to 50%.

Embodiment 3. The electrode plate according to Embodiment 1 or 2, wherein preferably, a single-sided thickness H of the conductive primer coating layer is 0.1 μm to 5 μm, or more preferably, a ratio of H to D2 is 0.5:1 to 5:1; and/or the binder in the conductive primer coating layer comprises an aqueous binder; and/or the conductive material is a mixed material of a zero-dimensional conductive carbon material and a one-dimensional conductive carbon material or a mixed material of a zero-dimensional conductive carbon material and a two-dimensional conductive carbon material.

Embodiment 4. The electrode plate according to any one of Embodiments 1 to 3, wherein the conductive layer is a metal conductive layer, and a material of the metal conductive layer is selected from at least one of aluminum, copper, nickel, titanium, silver, nickel-copper alloy, and aluminum-zirconium alloy; and/or
  a material of the support layer is selected from at least one of an insulation polymer material, an insulation polymer composite material, a conductive polymer material, and a conductive polymer composite material, and preferably, the material of the support layer is an insulation polymer material or an insulation polymer composite material.

Embodiment 5. The electrode plate according to any one of Embodiments 1 to 4, wherein a thickness D1 of the support layer satisfies 1 µm≤D1≤15 µm; and/or a room-temperature Young's modulus E of the support layer satisfies 20 Gpa≥E≥1.9 Gpa; and/or there is a crack in the conductive layer.

Embodiment 6. The electrode plate according to any one of Embodiments 1 to 5, wherein a protection layer is further provided on a surface of the conductive layer of the current collector, the protection layer is provided only on one surface of the conductive layer of the current collector or provided on two surfaces of the conductive layer of the current collector, and a thickness D3 of the protection layer satisfies: D3≤1/10×D2 and 1 nm≤D3≤200 nm, and preferably 10 nm≤D3≤50 nm.

Embodiment 7. The electrode plate according to any one of Embodiments 1 to 6, wherein a thickness of the conductive primer coating layer in the extension zone of the current collector is greater than a thickness of the conductive primer coating layer in the film zone, or an amount of the conductive material contained in the conductive primer coating layer in the extension zone of the current collector is higher than an amount of the conductive material contained in the conductive primer coating layer in the film zone.

Embodiment 8. The electrode plate according to any one of Embodiments 1 to 7, wherein a support protection layer is further provided on a surface of the conductive primer coating layer in the extension zone of the current collector, and the support protection layer is an organic insulation layer or an inorganic insulation layer;
  preferably, the organic insulation layer is selected from an insulation tape layer or an insulation glue coating layer, the insulation glue coating layer is selected from at least one of a polyvinylidene fluoride layer, a polyvinylidene fluoride layer, a vinylidene fluoride-hexafluoropropylene copolymer layer, a styrene butadiene rubber layer, a sodium carboxymethyl cellulose layer, a polyacrylic acid layer, a sodium polyacrylate layer, a polyepoxy ethane layer, and a polyvinyl alcohol layer; and preferably, the inorganic insulation layer is selected from at least one of an aluminum oxide layer, a magnesium oxide layer, a zinc oxide layer, a silicon oxide layer, a titanium oxide layer, a zirconium oxide layer, an aluminum nitride layer, a silicon nitride layer, a calcium fluoride layer, and a barium fluoride layer.

Embodiment 9. The electrode plate according to any one of Embodiments 1 to 8, wherein viewed in a width direction of a coated surface of the electrode plate, the electrode active material layer based on compacted density comprises 2n+1 zones, and compacted density of a middle zone is greater than compacted density of zones on both sides, wherein n=1, 2, or 3; and preferably, n=1; and/or
  the electrode active material layer comprises an electrode active material, a binder, and a conductive agent, and an average particle size D50 of the electrode active material is 5 µm to 15 µm.

Embodiment 10. An electrochemical apparatus, comprising a positive electrode plate, a negative electrode plate, a separator, and an electrolyte solution, wherein the positive electrode plate and/or the negative electrode plate are/is the electrode plate according to any one of Embodiments 1 to 9.

Embodiment 11. An apparatus, comprising the electrochemical apparatus according to Embodiment 10, wherein the electrochemical apparatus is used as a power supply of the apparatus.

A person skilled in the art may understand that the foregoing shows an application example of an electrode plate in this application only by using a lithium battery as an example. However, the electrode plate in this application may also be applied to another type of battery or electrochemical apparatus, and a good technical effect of this application can still be achieved.

According to the disclosure and teaching of this specification, a person skilled in the art of this application may further make appropriate changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. An electrode plate, comprising a current collector, an electrode active material layer provided on at least one surface of the current collector, and an electrical connection member electrically connected to the current collector, wherein
  the electrode active material layer is provided on a main body portion of the current collector at a film zone, the electrical connection member and the current collector are welded and connected at an edge of the current collector at a transfer welding zone, and an extension zone is of the current collector between the film zone and the transfer welding zone, and is coated with no electrode active material layer;
  the current collector comprises a support layer and a conductive layer provided on at least one surface of the support layer, a single-sided thickness D2 of the conductive layer satisfies: 30 nm≤D2≤3 µm, and the support layer is a polymer material layer or a polymer composite material layer; and
  a conductive primer coating layer containing a binder and a conductive material is separately provided between the current collector and the electrode active material layer in the film zone of the current collector and on a surface of the extension zone of the current collector; and
  viewed in a width direction of a coated surface of the electrode plate, the electrode active material layer based on compacted density comprises 2n+1 zones, and compacted density of a middle zone is greater than compacted density of zones on both sides, wherein n=1, 2, or 3.

2. The electrode plate according to claim 1, wherein based on a total weight of the conductive primer coating layer, a percentage of the conductive material by weight is 10% to 99%; and/or
based on a total weight of the conductive primer coating layer, a percentage of the binder by weight is 1% to 90%.

3. The electrode plate according to claim 2, wherein a percentage of the conductive material by weight is 20% to 80%; and/or
a percentage of the conductive material by weight is 20% to 80%.

4. The electrode plate according to claim 2, wherein a percentage of the conductive material by weight is 50% to 80%; and/or
a percentage of the binder by weight is 20% to 50%.

5. The electrode plate according to claim 1, wherein a single-sided thickness H of the conductive primer coating layer is 0.1 µm to 5 µm; and/or
the binder in the conductive primer coating layer comprises an aqueous binder; and/or
the conductive material is a mixed material of a zero-dimensional conductive carbon material and a one-dimensional conductive carbon material or a mixed material of a zero-dimensional conductive carbon material and a two-dimensional conductive carbon material.

6. The electrode plate according to claim 5, wherein a ratio of H to D2 is 0.5:1 to 5:1.

7. The electrode plate according to claim 1, wherein the conductive layer is a metal conductive layer, and a material of the metal conductive layer is selected from at least one of aluminum, copper, nickel, titanium, silver, nickel-copper alloy, and aluminum-zirconium alloy; and/or
a material of the support layer is selected from at least one of an insulation polymer material, an insulation polymer composite material, a conductive polymer material, and a conductive polymer composite material.

8. The electrode plate according to claim 7, wherein the material of the support layer is an insulation polymer material or an insulation polymer composite material.

9. The electrode plate according to claim 1, wherein a thickness D1 of the support layer satisfies 1 µm≤D1≤15 µm; and/or a room-temperature Young's modulus E of the support layer satisfies 20 Gpa≥E≥1.9 Gpa; and/or there is a crack in the conductive layer.

10. The electrode plate according to claim 1, wherein a protection layer is further provided on a surface of the conductive layer of the current collector, the protection layer is provided only on one surface of the conductive layer of the current collector or provided on two surfaces of the conductive layer of the current collector, and a thickness D3 of the protection layer satisfies: D3≤1/10×D2 and 1 nm≤D3≤200 nm.

11. The electrode plate according to claim 10, wherein the thickness D3 of the protection layer satisfies: 10 nm≤D3≤50 nm.

12. The electrode plate according to claim 1, wherein a thickness of the conductive primer coating layer in the extension zone of the current collector is greater than a thickness of the conductive primer coating layer in the film zone, or an amount of the conductive material contained in the conductive primer coating layer in the extension zone of the current collector is higher than an amount of the conductive material contained in the conductive primer coating layer in the film zone.

13. The electrode plate according to claim 1, wherein a support protection layer is further provided on a surface of the conductive primer coating layer in the extension zone of the current collector, and the support protection layer is an organic insulation layer or an inorganic insulation layer.

14. The electrode plate according to claim 13, wherein the organic insulation layer is selected from an insulation tape layer or an insulation glue coating layer, the insulation glue coating layer is selected from at least one of a polyvinylidene fluoride layer, a polyvinylidene fluoride layer, a vinylidene fluoride-hexafluoropropylene copolymer layer, a styrene butadiene rubber layer, a sodium carboxymethyl cellulose layer, a polyacrylic acid layer, a sodium polyacrylate layer, a polyepoxy ethane layer, and a polyvinyl alcohol layer.

15. The electrode plate according to claim 13, wherein the inorganic insulation layer is selected from at least one of an aluminum oxide layer, a magnesium oxide layer, a zinc oxide layer, a silicon oxide layer, a titanium oxide layer, a zirconium oxide layer, an aluminum nitride layer, a silicon nitride layer, a calcium fluoride layer, and a barium fluoride layer.

16. The electrode plate according to claim 1, wherein the electrode active material layer comprises an electrode active material, a binder, and a conductive agent, and an average particle size D50 of the electrode active material layer is 5 µm to 15 µm.

17. An electrochemical apparatus, comprising a positive electrode plate, a negative electrode plate, a separator, and an electrolyte solution, wherein the positive electrode plate and/or the negative electrode plate are/is the electrode plate according to claim 1.

18. An apparatus, comprising the electrochemical apparatus according to claim 17, wherein the electrochemical apparatus is used as a power supply of the apparatus.

* * * * *